(12) United States Patent
Sato

(10) Patent No.: US 6,515,824 B1
(45) Date of Patent: Feb. 4, 2003

(54) THIN FILM MAGNETIC HEAD ADAPTABLE TO TRACK NARROWING OF MAGNETIC RECORDING MEDIUM AND THE METHOD OF MANUFACTURING THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/579,004

(22) Filed: May 25, 2000

(30) Foreign Application Priority Data

May 26, 1999 (JP) ............................................. 11-146627
Jun. 28, 1999 (JP) ............................................. 11-181233

(51) Int. Cl.$^7$ ............................................. G11B 5/147
(52) U.S. Cl. ....................................................... 360/126
(58) Field of Search ................................. 360/125, 126, 360/317

(56) References Cited

U.S. PATENT DOCUMENTS

| | | |
|---|---|---|
| 5,452,164 A | 9/1995 | Cole et al. |
| 5,649,351 A | 7/1997 | Cole et al. |
| 5,652,687 A | 7/1997 | Chen et al. |
| 5,802,700 A | 9/1998 | Chen et al. |
| 6,104,574 A * | 8/2000 | Takano et al. ............... 360/126 |
| 6,115,216 A * | 9/2000 | Yoda et al. .................. 360/121 |

* cited by examiner

Primary Examiner—George J. Letscher
(74) Attorney, Agent, or Firm—Brinks Hofer Gilson & Lione

(57) ABSTRACT

A thin film magnetic head includes an insulating layer having a trench which has a track-width region formed with a track width Tw, and an inclined region having inclined surfaces formed to gradually increase the width dimension of the trench from the track-width region to the surface of the insulating layer. An upper core layer is formed on the inclined surfaces to relieve magnetic flux saturation and suppress the occurrence of write fringing. A lower pole layer, a gap layer, and an upper pole layer are previously formed in the trench of the insulating layer, thereby permitting the formation of a resist layer to a uniform thickness. By using the resist layer, inclined surfaces can be formed in a predetermined shape in the insulating layer with high reproducibility. Therefore, the upper core layer formed on the inclined surfaces can be appropriately separated from the lower pole layer, thereby suppressing the occurrence of write fringing.

7 Claims, 14 Drawing Sheets

THIN FILM MAGNETIC HEAD ADAPTABLE TO TRACK NARROWING OF MAGNETIC RECORDING MEDIUM AND THE METHOD OF MANUFACTURING THE SAME

BACKGROUND OF THE INVENTION

1. Field of the Invention

The present invention relates to a thin film magnetic recording head which is used for, for example, a floating magnetic head, which is adaptable to track narrowing, and which can appropriately suppress the occurrence of write fringing and magnetic flux saturation, and a method of manufacturing the thin film magnetic head.

2. Description of the Related Art

A thin film magnetic head mounted to a hard disk or the like comprises, for example, an inductive head for writing signals on a recording medium such as a hard disk, and a MR head for reading signals from the recording medium.

The inductive head generally comprises upper and lower core layers made of a magnetic material, and a coil layer for inducing a recording magnetic field in the core layers so that a magnetic signal is recorded on a recording medium by a leakage magnetic field between the core layers.

In recent years, the track width Tw of the inductive head has been decreased to comply with the requirement for narrowing a track accompanying an increase in recording density. The track width Tw is determined by the width dimension at the end of the upper core layer exposed in a surface (ABS) facing the recording medium.

The upper core layer is conventionally formed by, for example, a so-called frame plating process. In this frame plating process, a resist layer is patterned in the shape of the upper core layer, and a magnetic material used as a material for the upper core layer is plated in the pattern. Then, the resist layer is removed to complete the upper core layer having an end with the track width Tw.

However, the frame plating process is very difficult to pattern the resist layer with the small track width Tw because of the resolution limit of exposure in pattering the resist layer. This problem will become significant with further increases in recording density in future.

U.S. Pat. No. 5,652,687 discloses the structure of an inductive head formed by a process different from the above-described frame plating process, and a method of producing the inductive head. FIG. 10 shows the frame plating process disclosed in U.S. Pat. No. 5,652,687.

In FIG. 10, reference numeral 102 denotes a lower pole layer (lower core layer) on which a notch structure 120 made of silicon dioxide or the like is formed. FIG. 11 is a perspective view showing the shape of the notch structure 120, a trench 148 being formed in the notch structure 120. A pole tip layer P1 (T), a gap layer G, and a pole tip layer P2 (T) are laminated in the trench 148.

Furthermore, the pole tip 108 of an upper pole layer (upper core layer) 104, which has a width dimension larger then the width dimension of the pole tip layer P2 (T), is formed on the pole tip layer P2 (T) and the notch structure 120.

This publication discloses that the production process can provide a thin film magnetic write head having a sub-micron track width. The publication also discloses that as shown in FIG. 10, the pole tip 108 having a width dimension larger then the width dimension of the pole tip layer P2 (T) is formed on the pole tip layer P2 (T), and magnetic saturation accompanying track narrowing can thus be prevented by the formation of the pole tip 108.

The inductive head shown in FIG. 10 has the function to write signals on the recording medium by means of a leakage magnetic field produced between the core layers. However, since the pole tip 108 is formed at right angles on the upper edge of the pole tip layer P2 (T), the leakage magnetic field reaches from the pole tip 108 to the pole tip layer PI (T), as shown by broken lines in FIG. 10. As a result, write fringing (writing blot) which occurs on both sides of the track width Tw is easily formed on the recording medium.

The occurrence of write fringing makes it impossible to precisely detect the track position on the written recording medium, thereby causing tracking servo error. Particularly, in high-density recording, the track pitch is decreased to increase the influence of write fringing.

The problem of write fringing significantly occurs when a leakage magnetic field reaches from the pole tip 108 to the pole tip layer P2 (T). A possible method of suppressing the occurrence of write fringing is to decrease the width dimension of the pole tip 108.

However, a decrease in the width dimension of the pole tip 108 causes a problem of magnetic saturation, thereby decreasing the magnetic flux density and deteriorating recording properties.

Therefore, the inductive head disclosed in U.S. Pat. No. 5,652,687 does not have a structure which can simultaneously prevent the occurrence of write fringing and magnetic saturation.

FIG. 24 is a partial front view showing a manufacturing step of a thin film magnetic head which is improved for suppressing the occurrence of write fringing.

In the step shown in FIG. 24, an insulating layer 5 is formed on a lower core layer 1 made of a magnetic material, and a trench 3 is formed in the insulating layer 5 to form the insulating layer 5 in the same shape as the notch structure 120 shown in FIG. 11.

As shown in FIG. 24, a resist layer 4 is coated on the surface of the insulating layer 5 by spin coating to fill a portion of the trench 3 of the insulating layer 5 with the resist layer 4.

Since the trench 3 formed in the insulating layer 5 is filled with the resist layer 4, the thickness of the resist layer 4 formed on the insulating layer 5 decreases toward the trench 3.

In the state shown in FIG. 24, the surface of the insulating layer 5 coated with the resist layer 4 is etched off, for example, by ion milling to cut the both edges 5a of the insulating layer 5 in the vicinity of the trench 3. As a result, inclined surfaces 5b are formed at both edges 5a of the insulating layer 5 so that the distance between the inclined surfaces 5b decreases toward the lower core layer 1, as shown in FIG. 25.

After the resist layer 4 shown in FIG. 25 is completely removed, the same layers as the pole tip layer P1 (T), the gap layer G and the pole tip layer P2 (T) shown in FIG. 10 are laminated in the trench 3 shown in FIG. 25, and the same layer as the pole tip 108 shown in FIG. 10 is further formed on the pole tip layer P2 (T).

In this manufacturing method, the layer corresponding to the pole tip 108 shown in FIG. 10 is formed along the inclined surfaces 5b of the insulating layer 5. Since the layer corresponding to the pole tip 108 has a shape in which the width gradually increases away from the gap layer G, the leakage magnetic field shown by the broken lines in FIG. 10 less occurs, thereby preventing the occurrence of write fringing on the both sides of the track width Tw.

However, in the process comprising forming the inclined surfaces 5b shown in FIGS. 24 and 25, the trench 3 is formed in the insulating layer 5, and thus a variation easily occurs in the thickness of the resist layer 4 formed on the insulating layer 5. Such a variation in the thickness of the resist layer readily causes variations in the inclination angle and the shape of the inclined surfaces 5b formed in the insulating layer 5, thereby making quality unstable.

SUMMARY OF THE INVENTION

The present invention has been achieved for solving the above problems, and an object of the present invention is to provide a thin film magnetic head which is adaptable to track narrowing and which can effectively prevent write fringing and relieve magnetic flux saturation.

Another object of the present invention is to provide a thin film magnetic head for readily forming an inductive head with high reproducibility which can effectively suppress the occurrence of write fringing and magnetic flux saturation, and a method of manufacturing the thin film magnetic head.

A further object of the present invention is to provide a method of manufacturing a thin film magnetic head which is adaptable to track narrowing, and which can readily form inclined surfaces for effectively preventing write fringing with high reproducibility.

The present invention provides a thin film magnetic head comprising a lower core layer made of a magnetic material, an upper core layer made of a magnetic material, a gap layer for magnetically insulating the lower core layer from the upper core layer, and an insulating layer located between the lower core layer and the upper core layer, all of which are exposed in a surface facing a recording medium, wherein a trench is formed in the insulating layer to lead from the surface of the insulating layer to the lower core layer and further extend from the surface facing the recording medium in the height direction, the trench comprises a track-width region which defines the track width from the top of the lower core layer to a predetermined height, and an inclined region having inclined surfaces so that the width dimension of the trench gradually increases from the upper end of the track-width region to the surface of the insulating layer, the gap layer is located in the track-width region, and a portion of the upper core layer is formed to extend from the inclined surfaces formed in the trench in the direction away from the lower core layer.

In the present invention, as described above, the trench comprises the track-width region, which defines the track width from the upper side of the lower core layer to the predetermined height, and the inclined region which has the inclined surfaces so that the width dimension of the trench gradually increases from the upper end of the track-width region to the surface of the insulating layer, and a portion of the upper core layer is formed to extend from the inclined surfaces formed in the trench in the direction away from the lower core layer.

In the present invention, therefore, the upper core layer is formed on the inclined surfaces which are formed so that the width dimension of the trench of the insulating layer gradually increases, and thus the width dimension of the upper core layer can be formed with a width dimension larger than the track width Tw. It is also possible to suppress magnetic flux saturation, and appropriately separate the upper core layer from a lower pole layer formed in the track-width region of the trench and magnetically connected to the lower core layer, thereby appropriately suppressing the occurrence of write fringing.

In the present invention, the upper core layer is preferably formed on the inclined surfaces to reach the boundaries between the inclined surfaces and the surface of the insulating layer, and further extend from the boundaries in the direction away from the lower core layer.

In the present invention, the upper core layer is preferably formed to extend perpendicularly to the planar direction of the lower core layer.

The insulating layer may be formed so that the thickness gradually decreases from each of the boundaries between the inclined surfaces and the insulating layer surface in the direction away from the trench. In this case, the surface of the insulating layer may be concavely curved.

In the present invention, preferably, the lower pole layer is formed at the bottom of the trench formed in the insulating layer to be magnetically connected to the lower core layer, and the gap layer is formed on the lower pole layer, and an upper pole layer is formed on the gap layer to be magnetically connected to the upper core layer. The film structure formed in the track-width region may be changed to another structure.

In the present invention, in the above-described construction, both the lower pole layer and the upper pole layer are preferably formed in the track-width region of the trench.

The present invention also provides a method of manufacturing a thin film magnetic head comprising a lower core layer made of a magnetic material, and an upper core layer made of a magnetic material and formed opposite to the lower core layer with a nonmagnetic gap layer provided therebetween on a surface facing a recording medium, the method comprising the steps of forming, on the lower core layer, an insulating layer having a trench having an internal width dimension corresponding to a track width in the height direction from the surface facing the recording medium, continuously laminating a lower pole layer magnetically connected to the lower core layer, a gap layer, and an upper pole layer magnetically connected to the upper core layer in the trench, forming inclined surfaces before or after the laminating step so that the width dimension of the trench gradually increases from an intermediate position of the trench, forming a resist layer on the insulating layer by exposure development with a space wider than the width dimension of the trench on the surface of the insulating layer to expose the surface of the upper pole layer, the inclined surfaces of the trench formed in the insulating layer, and a portion of the surface of the insulating layer in the space of the resist layer, forming an upper core layer in the space of the resist layer and removing the resist layer, and etching the side surfaces of the upper core layer by ion milling so that the side surfaces of the upper core layer are connected to the tops of the inclined surfaces.

In the manufacturing method of the present invention, the resist layer required for forming the upper core layer and having the space wider than the width dimension of the trench formed in the insulating layer is formed by exposure development.

Namely, in the present invention, by exposure development, the coated resist layer is removed from the trench of the insulating layer to leave only the resist layer which is coated to a substantially constant thickness on the flat surface of the insulating layer. Therefore, in exposure development, irregular reflection less occurs due to a difference in focus, thereby forming the resist layer in a stable shape on the surface of the insulating layer.

Since not only the surface of the upper pole layer and the inclined surfaces of the trench, but also a portion of the surface of the insulating layer are exposed in the space of the resist layer, the upper core layer formed in the space of the resist layer by plating extends not only to the surface of the upper pole layer and the inclined surfaces of the trench, but also to the surface of the insulating layer. In this state, a leakage magnetic field occurs between the upper core layer formed to extend to the surface of the insulating layer and the lower pole layer, thereby possibly causing write fringing. Therefore, in the present invention, the side surfaces of the upper core layer are etched by ion milling in the next step to remove the portion of the upper core layer, which is formed on the surface of the insulating layer, so that the side surfaces of the upper core layer are connected to the tops of the inclined surfaces of the trench.

The thin film magnetic head of the present invention manufactured as described above is adaptable to track narrowing, and can effectively prevent write fringing and suppress magnetic flux saturation.

The manufacturing method of the present invention can easily form, with high reproducibility, the upper core layer which has a significant influence on the problem of write fringing and magnetic flux saturation, thereby improving yield.

Furthermore, in the present invention, the surface of the insulating layer may be etched by ion milling at the same time as ion milling for etching the side surfaces of the upper core layer to form a concavely curved surface so that the thickness of the insulating layer gradually decreases from each of the boundaries between the surface of the insulating layer and the inclined surfaces of the trench in the direction away from the trench.

In the present invention, the upper core layer is preferably formed perpendicularly to the planar direction of the lower core layer by the ion milling.

The present invention further provides a method of manufacturing a thin film magnetic head comprising a lower core layer made of a magnetic material, and an upper core layer made of a magnetic material opposite to the lower core layer with a nonmagnetic gap layer formed therebetween on a surface facing a recording medium, the method comprising the first step of forming an insulating layer having an internal width dimension corresponding to a track width dimension in the height direction from the surface facing the recording medium, the second step of forming a lower pole layer in the trench by plating so that the lower pole layer is magnetically connected to the lower core layer, the third step of forming a gap layer made of a nonmagnetic material on the lower pole layer in the trench, the fourth step of forming an upper pole layer on the gap layer in the trench by plating, the fifth step of forming a resist layer having a space having a width dimension wider than the trench of the insulating layer on the insulating layer to expose portions of the insulating layer at both sides of the upper pole layer in the trench, the sixth step of cutting away the portions of the insulating layer, which are exposed in the space of the resist layer, to form inclined surfaces in the insulating layer so that the distance therebetween gradually increases from the upper pole layer side to the surface of the insulating layer, the seventh step of removing the resist layer, and the eighth step of forming an upper core layer by plating so that the upper core layer is magnetically connected to the upper pole layer in the inclined surfaces of the insulating layer.

For example, the fourth step comprises forming the upper pole layer by plating to form steps between the surface of the upper pole layer and the surface of the insulating layer so that the surface position of the upper pole layer is lower than the surface position of the insulating layer, and the sixth step comprises cutting away the steps of the insulating layer to form the inclined surfaces.

In the sixth step, inclined surfaces can be formed in the upper pole layer to be connected to the inclined surfaces formed in the insulating layer.

In this case, the above-described steps may be either formed or not between the surface of the upper pole layer and the surface of the insulating layer.

A nonmagnetic metal material is selected for the gap layer so that the gap layer can be formed by plating in the third step.

In this case, as the nonmagnetic metal material, at least one material can be selected from NiP, NiPd, NiPt, NiRh, NiW, NiMo, Au, Pt, Rh, Pd, Ru, and Cr.

By selecting the nonmagnetic metal material for the gap layer, not only the lower pole layer and the upper pole layer but also the gap layer can be formed with uniform thicknesses in the trench.

In the present invention, as described above, the lower pole layer, the gap layer and the upper pole layer are continuously formed by plating in the trench of the insulating layer formed on the lower core layer, and the inclined surfaces are formed on both sides of the upper pole layer so that the distance therebetween increases from the surface of the upper pole layer to the surface of the insulating layer.

In the present invention, as described above, the lower pole layer, the gap layer and the upper pole layer are buried in the trench formed in the insulating layer so that the resist layer used for forming the inclined surfaces can be formed on a substantially flat surface (on the insulating layer and the upper pole layer). Therefore, the resist layer can be formed to a uniform thickness, thereby forming the inclined surfaces in a predetermined shape at both side edges of the trench of the insulating layer with high reproducibility and controllability.

Since the inclined surfaces having the predetermined shape can be easily formed with high reproducibility, the distance between the upper core layer and the lower pole layer can be appropriately set in forming the upper core layer on the inclined surfaces, thereby making adaptable to track narrowing, and permitting manufacture of inductive heads causing no write fringing with high yield.

DESCRIPTION OF THE PREFERRED EMBODIMENT

Figure 1:
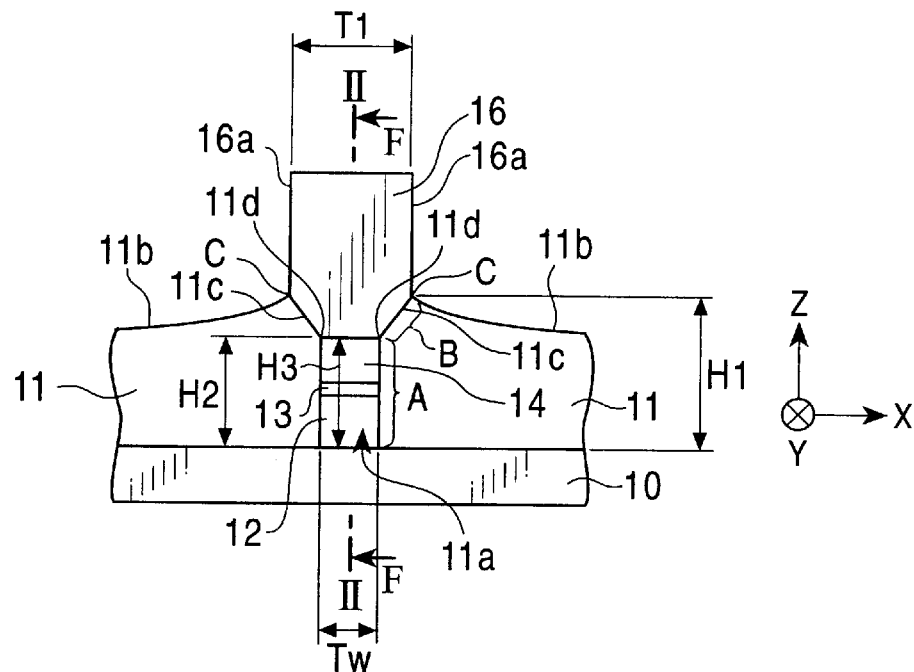
FIG. 1 is a partial front view showing the structure of the ABS of a thin film magnetic head (inductive head) in accordance with an embodiment of the present invention.
Figure 2:
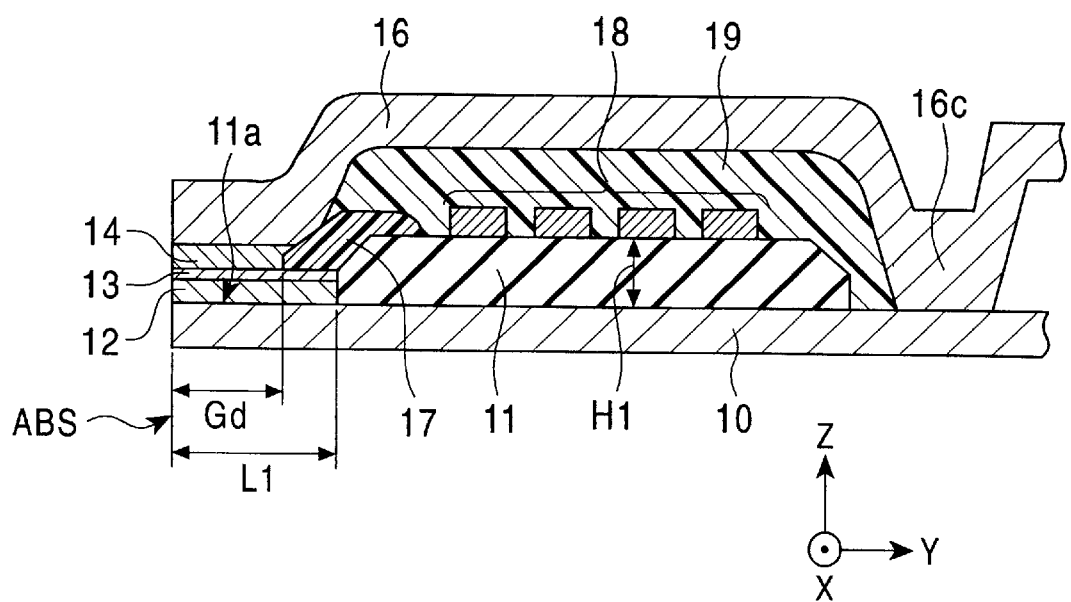
FIG. 2 is a partial sectional view of the thin film magnetic head taken along line II—II in FIG. 1, as viewed from the F direction.

FIG. 1 is a partial front view showing the structure of a thin film magnetic head of the present invention, and FIG. 2 is a partial sectional view of the thin film magnetic head taken alone line II—II in FIG. 1, as viewed from the F direction.

The thin film magnetic head shown in FIGS. 1 and 2 is a so-called write inductive head which is laminated on a read head utilizing a magnetoresistive effect.

The read head comprises a magnetoresistive element comprising a GMR element, for example, such as a spin valve film, which utilizes a giant magnetoresistive effect, or an AMR element which utilizes an anisotropic magnetoresistive effect, and shield layers formed above and below the magnetoresistive element with gap layers provided therebetween.

In FIG. 1 and 2, reference numeral 10 denotes a lower core layer made of a soft magnetic material having high magnetic permeability, such as a Fe—Ni alloy (permalloy).

As shown in FIGS. 1 and 2, an insulating layer 11 made of an insulating material is formed on the lower core layer 10. The insulating material is composed of at least one of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON, and the insulating layer 11 is either single-layered or multilayered.

As shown in FIGS. 1 and 2, a thickest portion of the insulating layer 11 has a thickness dimension Hi, and the thickness dimension H1 is preferably about 1.0 $\mu$m to 4.0 $\mu$m.

In the present invention, the insulating layer 11 has a trench 11a which is formed with a predetermined length dimension L1 in the height direction (the Y direction shown in the drawings) from the surface (ABS) facing the recording medium so as to extend from the surface 11b of the insulating layer 11 to the lower core layer 10.

As shown in FIG. 1, the trench 11a comprises a track-width region A having a track width Tw formed from the lower core layer 10 to a predetermined height H2, and an inclined region B having inclined surfaces 11c which are formed so that the width dimension of the trench 11a gradually increases from the upper edges 11d of the track-width region A to the surface 11b of the insulating layer 11. The trench 11a is formed by, for example, anisotropic etching, as in the manufacturing method described below. Although the thickness dimension H1 of the insulating layer 11 is about 1.0 $\mu$m to 4.0 $\mu$m, as described above, an excessively large thickness dimension H1 causes a problem in which the trench 11a cannot be formed with a smaller track width Tw than conventional values because of the problem of pattern precision.

In the present invention, the width dimension (i.e., the track width Tw) of the track-width region A of the trench 11a is 1.0 $\mu$m or less, preferably 0.7 $\mu$m or less.

In the embodiment shown in FIG. 1, a lower pole layer 12 is formed as a lowermost layer in the track-width region A so as to be magnetically connected to the lower core layer 10.

The lower pole layer 12 is made of a magnetic material such as permalloy or the like, and the material of the lower pole layer 12 may be the same as or different from the lower core layer 10. The lower pole layer 12 is formed in the trench 11a by electroplating. The lower pole layer 12 is formed in a rectangular shape to a uniform thickness in the trench 11a, and thus distortion or the like less occurs in the plane (surface) thereof.

As shown in FIGS. 1 and 2, a gap layer 13 is laminated on the lower pole layer 12 in the trench 11a.

In the present invention, the gap layer is made of a nonmagnetic metal material, and preferably formed in the trench 11a by electroplating. By electroplating, the gap layer 13 is formed to a uniform thickness on the lower pole layer 12, and thus distortion or the like less occurs in the surface of the gap layer 13.

In the present invention, as the nonmagnetic metal material, at least one material is preferably selected from NiP, NiPd, NiPt, NiRh, NiW, NiMo, Au, Pt, Rh, Pd, Ru, and Cr, and the gap layer 13 may comprise either a single layer film or a multilayer film.

As shown in FIGS. 1 and 2, an upper pole layer 14 is laminated on the gap layer 13 in the trench 11a. The upper pole layer 14 is magnetically connected to the upper core layer 16 which will be described below, and like the above-described lower pole layer 12, the upper pole layer 14 is formed by plating a magnetic material such as permalloy or the like. The material of the upper pole layer 14 may be the same as or different from the upper core layer 16.

Although, in FIG. 1, the lower pole layer 12, the gap layer 13 and the upper pole layer 14 are continuously formed in the track-width region A by plating, the film structure formed in the track-width region A is not limited to this structure. However, the gap layer 13 interposed between the upper pole layer 14 and the lower pole layer 12 must be formed in at least the track-width region A.

As shown in FIG. 1, the total thickness H3 of the lower pole layer 12, the gap layer 13 and the upper pole layer 14 is substantially the same as the height dimension H2 of the track-width region A.

However, in the present invention, the total thickness H3 may be different from the height dimension H2 of the track-width region A. Namely, the total thickness H3 may be larger than the height dimension H2 of the track-width region A so that the upper pole layer 14 is formed to project to the inclined region B of the trench 11a. Alternatively, the total thickness H3 may be smaller than the height dimension H2 of the track-width region A.

As shown in FIG. 1, the upper core layer 16 is formed on the inclined surfaces 11c formed in the trench 11a to reach the boundaries C between the inclined surfaces 11c and the surface 11b of the insulating layer 11, and further extend from the boundaries C in the direction (the upward direction in the drawing) away from the lower core layer 10.

As shown in FIG. 1, the bottom of the upper core layer 16 is magnetically connected to the upper pole layer 14. The upper core layer 16 is made of a magnetic material such as permalloy or the like, and may comprise the same material as or a different material from the upper pole layer 14.

In the embodiment shown in FIG. 1, the upper core layer 16 is preferably formed to extend from the boundaries C between the inclined surfaces 11c of the trench 11a and the surface 11b of the insulating layer 11 in the upward direction shown in the drawing because the width dimension T1 of the upper core layer 16 can be increased to prevent magnetic flux saturation.

As in the manufacturing method described below, where the upper core layer 16 is formed to extend from the boundaries C between the inclined surfaces 11c of the trench 11a and the surface 11b of the insulating layer 11 in the upward direction shown in the drawing, the upper core layer 16 can easily be formed in a predetermined shape with high reproducibility, and the yield can be improved.

As shown in FIG. 1, the upper core layer 16 is preferably formed so that the side surfaces 16a extend perpendicularly (in the Z direction shown in the drawing) to the planar direction (the X direction shown in the drawing) of the lower core layer 10. However, the side surfaces 16a of the upper core layer 16 may be extended obliquely in the upward direction with respect to the planar direction (the X direction shown in the drawing) of the lower core layer 10. In this case, from the viewpoint of suppression of magnetic flux saturation, the upper core layer 16 is preferably inclined in the direction in which the width dimension increases away from the lower core layer 10.

In the embodiment shown in FIG. 1, the insulating layer 11 is formed so that the thickness is H1 near the boundaries C between the inclined surfaces 11c of the trench 11a and the surface 11b of the insulating layer 11, and gradually decreases from each of the boundaries C in the direction away from the trench 11a. As shown in FIG. 1, the surface 11b of the insulating layer 11 is formed to be concavely curved.

Although, in FIG. 1, the surface 11b of the insulating layer 11 is concavely curved so that the thickness thereof gradually decreases in the direction away from the trench 11a, this shape can be formed by the manufacturing method which will be described below. In the present invention, the insulating layer 11 may be formed so that the thickness is substantially the same at any position, or the surface 11b of the insulating layer 11 may be a tapered surface (inclined surface), not a curved surface.

As shown in FIG. 2, in the present invention, a Gd determining insulating layer 17 is formed on the gap layer 13 formed in the trench 11a of the insulating layer 11, with a predetermined gap (Gd) from the ABS in the height direction (the Y direction shown in the drawing), to extend backward to the insulating layer 11 in the height direction. The Gd determining insulating layer 17 is made of an organic resin material, for example, such as polyimide, a resist material, or the like.

The Gd determining insulating layer 17 is provided for determining the gap depth (Gd) which must be set to an appropriate length dimension because the gap depth Gd has a significant influence on the electrical properties of a thin film magnetic head.

In the present invention, the Gd determining insulating layer 17 is formed on the gap layer 13 in order to set the gap depth Gd to the predetermined length dimension. However, in another embodiment of the present invention in which the length dimension L1 of the trench 11a formed in the insulating layer 11 is set as the gap depth Gd, the length dimension L1 of the trench 11 coincides with the gap depth Gd, and thus the Gd determining insulating layer 17 need not be formed.

As shown in FIG. 2, a coil layer 18 is spirally formed by patterning on a portion of the insulating layer 11 which is located at the back the trench 11a of the insulating layer 11 in the height direction. Although, in the embodiment shown in FIG. 2, the coil layer 18 is formed directly on the insulating layer 11, the Gd determining insulating layer 17 may be formed between the coil layer 18 and the insulating layer 11.

A coil insulating layer 19 is further formed on the coil layer 18 to cover the coil layer 18. The coil insulating layer 19 is made of an organic resin material such as a resist material, polyimide, or the like.

As shown in FIG. 2, the upper core layer 16 is formed to extend from the ABS side in the height direction, the base end 16c of the upper core layer 16 being magnetically connected to the lower core layer 10.

Figure 3:
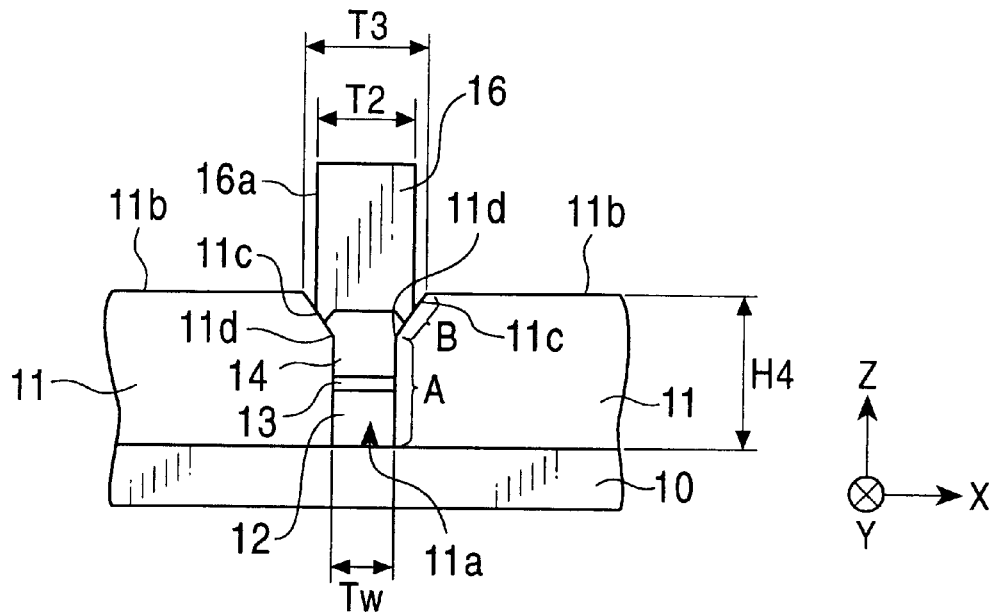
FIG. 3 is a partial front view showing the structure of the ABS of a thin film magnetic head (inductive head) in accordance with another embodiment of the present invention.

FIG. 3 is a partial front view showing the structure of a thin film magnetic head in accordance with a further embodiment of the present invention.

Like the thin film magnetic head shown in FIG. 1, the thin film magnetic head shown in FIG. 3 comprises an insulating layer 11 formed on a lower core layer 10 and having a trench 11a comprising a track-width region A and an inclined region B, a lower pole layer 12, a gap layer 13 and an upper pole layer 14 being laminated in turn from below in the trench 11a.

In the embodiment shown in FIG. 3, the upper pole layer 14 is formed to further project from the track-width region A to the inclined region B.

As shown in FIG. 3, the upper core layer 16 formed on the upper pole layer 14 to be magnetically connected thereto perpendicularly extends from an intermediate position of the inclined surfaces 11c formed in the trench 11a in the direction (the Z direction shown in the drawing) away from the lower core layer 10.

Therefore, as shown in FIG. 3, the width dimension T2 of the upper core layer 16 is smaller than the width dimension T3 of the trench 11a on the surface 11b of the insulating layer 11.

In this embodiment, the surface 11b of the insulating layer 11 is substantially parallel to the planar direction (the X direction shown in the drawing) of the lower core layer 10, and thus the insulating layer 11 is formed to a substantially uniform thickness H1 at any position.

In each of the thin film magnetic heads shown in FIGS. 1 and 3, when a recording current is supplied to the coil layer 18, a recording magnetic field is induced in the lower core layer 10 and the upper core layer 16 to produce a leakage magnetic field between the lower pole layer 12 and the upper pole layer 14 which are opposed to each other with the gap layer 13 provided therebetween, thereby recording a magnetic signal on a recording medium such as a hard disk or the like by the leakage magnetic field.

As described in detail above, in the present invention, the trench 11a having a small width, specifically an internal width dimension of 1.0 μm or less, is formed in the insulating layer 11 formed on the lower core layer 10, and the internal width dimension is defined as the track width Tw. Furthermore, the lower pole layer 12 and the upper pole layer 14 are formed with the gap layer 13 provided therebetween in the trench 11a, for producing a leakage magnetic field necessary for recording magnetic signals on the recording medium. Therefore, a leakage magnetic field produced between the lower pole layer 12 and the upper pole layer 14 can be received in the small track width Tw, specifically the track width Tw of 1.0 μm or less, thereby making adaptable to track narrowing with an increase in recording density in future.

In the present invention, as shown in FIGS. 1 and 3, the trench 11a formed in the insulating layer 11 comprises the track-width region A and the inclined region B in which the inclined surfaces 11c are formed so that the width dimension of the trench 11a gradually increases from the upper edges 11d of the track-width region A to the surface 11b of the insulating layer 11. The upper core layer 16 magnetically connected to the upper pole layer 14 is formed on the inclined surfaces 11c, and thus the upper core layer 16 can be appropriately separated from the lower core layer 10 formed in, for example, the trench 11a of the insulating layer 11. Therefore, substantially no leakage magnetic field occurs between the upper core layer 16 and the lower core layer 10, thereby appropriately suppressing the occurrence of so-called write fringing.

In the present invention, the side surfaces 16a of the upper core layer 16 are extended from the inclined surfaces 11c formed in the trench 11a, preferably from the boundaries C between the inclined surfaces 11c and the surface 11b of the insulating layer 11, in the direction away from the lower core layer 10, and the width dimension T1 of the upper core layer 16 is larger than the track width Tw. Therefore, magnetic saturation can be relieved, and a decrease in magnetic flux density can be prevented, as compared with a conventional magnetic head in which the front end region of the upper core layer 16 is formed with the track width Tw.

Particularly, in the present invention, the upper core layer 16, which has a significant influence on the problem of write fringing and magnetic flux saturation, can easily be formed in the predetermined shape with high reproducibility by the manufacturing method described below, and the yield can be improved.

FIGS. 4 to 7 are drawings respectively showing the steps of the method of forming the thin film magnetic head, particularly the upper core layer 16, of the present invention. FIGS. 4 to 7 are drawings of the thin film magnetic head, as viewed from the front side.

Figure 4:
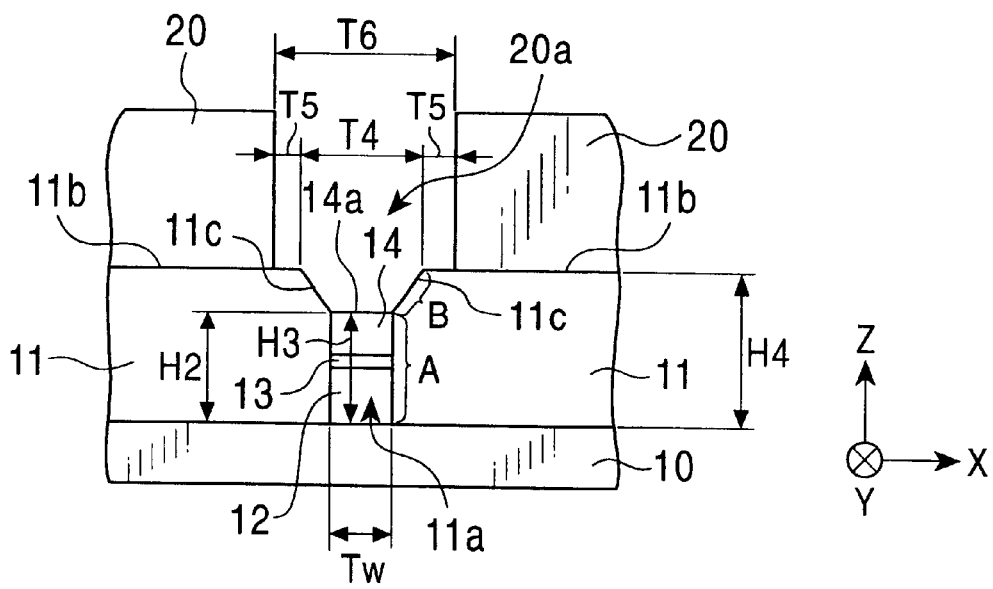
FIG. 4 is a drawing showing a step of a method of manufacturing a thin film magnetic head of the present invention.

In the step shown in FIG. 4, the insulating layer 11 is first formed on the lower core layer 10. The thickness H4 of the insulating layer 11 is preferably in the range of 1.0 μm to 4.0 μm. With an excessively large thickness, there is the problem of causing difficulties in forming the trench 11a having the small track width Tw in the insulating layer 11. As the insulating material used for the insulating layer 11, at least one material is selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The insulating layer 11 comprises either a single layer or a plurality of layers, and is formed by sputtering or evaporation.

In the present invention, the trench 11a having an internal width dimension equal to the track width Tw is formed in the insulating layer 11 by, for example, anisotropic etching to extend from the surface (ABS) facing the recording medium in the height direction (the Y direction shown in the drawing).

In the present invention, the width dimension (=the track width Tw) of the trench 11a is 1.0 μm or less, preferably 0.5 μm or less, thereby permitting manufacture of a thin film magnetic head adaptable to track narrowing with an increase in recording density in future.

Next, the lower pole layer 12 magnetically connected to the lower core layer 10, the gap layer 13 and the upper pole layer 14 magnetically connected to the upper core layer 16 are formed in turn from below in the trench 11a formed in the insulating layer 11 by plating.

The lower pole layer 12 and the upper pole layer 14 are made of a magnetic material, for example, such as NiFe, or the like, and this material may be different from the lower core layer 10 or the upper core layer 16.

The gap layer 13 is preferably made of a nonmagnetic metal material. As the nonmagnetic metal material, at least one material is preferably selected from NiP, NiPd, NiW, NiMo, NiRh, Au, Pt, Rh, Pd, Ru, and Cr. In the present invention, the gap layer 13 may comprise either a single layer film or a multilayer film.

Next, as shown in FIG. 4, the inclined surfaces 11c are formed in both side surfaces of the trench 11a from a predetermined height H2 to the surface 11b of the insulating layer 11 so that the width dimension of the trench 11a formed in the insulating layer 11 is larger than the track width Tw. The trench 11a has a width dimension T4 on the surface 11b of the insulating layer 11.

The above-described manufacturing method comprises forming the trench 11a with the track width Tw in the insulating layer 11, continuously forming the lower pole layer 12, the gap layer 13 and the upper pole layer 14 in the trench 11a by plating, and then forming the inclined surfaces 11 in the trench 11a from the predetermined height H2 to the surface 11b of the insulating layer 11. However, this order of the forming steps may be changed.

For example, the trench 11a with the track width Tw is first formed in the insulating layer 11, the inclined surfaces 11 are formed in the trench 11a from the predetermined height H2 to the surface 11b of the insulating layer 11, and then the lower pole layer 12, the gap layer 13 and the upper pole layer 14 are continuously formed in the trench 11a by plating.

As shown in FIG. 4, the total thickness H3 of the lower pole layer 12, the gap layer 13, and the upper pole layer 14 formed in the trench 11a is substantially the same as the height dimension H2 of the region A formed with the track width Tw in the trench 11a. However, the total thickness H3 may be larger or smaller than the height dimension H2.

In the present invention, a resist layer 20 is next formed on the surface 11b of the insulating layer 11, the inclined surfaces 11c of the trench 11a, and the upper pole layer 14, and a space 20a having a width dimension T6 larger than the width dimension T4 of the trench 11a on the surface 11b of the insulating layer 11 is formed in the resist layer 20 by exposure development patterning.

This space 20a is formed with the width dimension T6 in the height direction (the Y direction shown in the drawing) from the surface (ABS) facing the recording medium to a predetermined length position. The width dimension of the space 20a gradually increases in the backward direction from the predetermined length position.

Namely, the pat tern shape of the space 20a formed in the resist layer 20 coincides with the shape of the upper core layer 16 shown in FIG. 2. Particularly, in the present invention, the space 20a of the resist layer 20 has a pattern shape in which the width dimension T6 near the front end of the upper core layer is larger than the track width Tw, as shown in FIG. 4. Therefore, exposure resolution is high, and the space 20 having the predetermined shape can be formed in the resist layer 20 with high pattern precision.

Particularly, in the present invention, as described above, the width dimension T6 of the space 20a formed in the resist layer 20 is larger than the width dimension T4 of the trench 11a of the insulating layer 11 on the surface 11b of the insulating layer 11.

Namely, the resist layer 20 coated over the entire region of the surface 11b of the insulating layer 11 including the inside of the trench 11a formed in the insulating layer is removed by exposure development to leave the resist layer 20 on the flat surface 11b of the insulating layer 11, so that the resist layer 20 coated in the trench 11a is removed. The thickness of the resist layer 20 to be left is substantially equal at any position, as shown in FIG. 4. Therefore, in exposure development, irregular reflection less occurs due to a difference in focus, thereby forming the space 20a having the predetermined shape in the resist layer 20 with high pattern precision.

As shown in FIG. 4, the surface 14a of the upper pole layer 14, the inclined surfaces 11c of the trench 11a formed in the insulating layer 11, and a portion of the surface 11b of the insulating layer 11 are exposed in the space 20a of the resist layer 20.

The portion of the surface 11b of the insulating layer 11, which is exposed in the space of the resist layer 20, has a width dimension T5.

Figure 5:
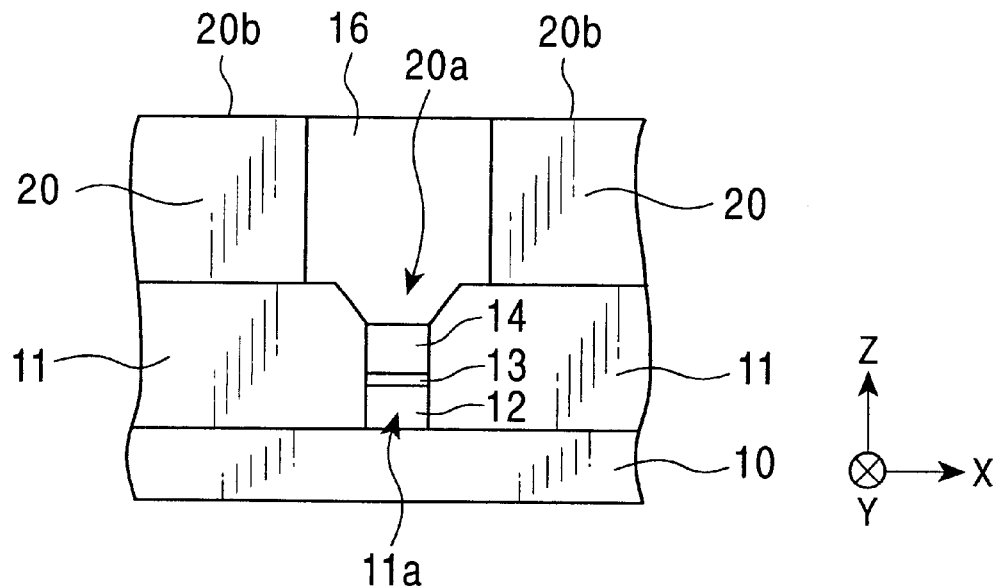
FIG. 5 is a drawing showing a step next to the step shown in FIG. 4.

As shown in FIG. 5, in the present invention, the upper core layer 16 is formed by plating in the space 20a formed in the resist layer 20.

In FIG. 5, the upper core layer 16 is formed by plating to substantially the same level as the surface 20b of the resist layer 20. However, in the present invention, the upper core layer 16 may be formed to a level lower than the surface 20b of the resist layer 20.

In the step shown in FIG. 5, the upper pole layer 14 formed in the trench 11a of the insulating layer 11 is magnetically connected to the upper core layer 16 formed on the upper pole layer 14.

Figure 6:
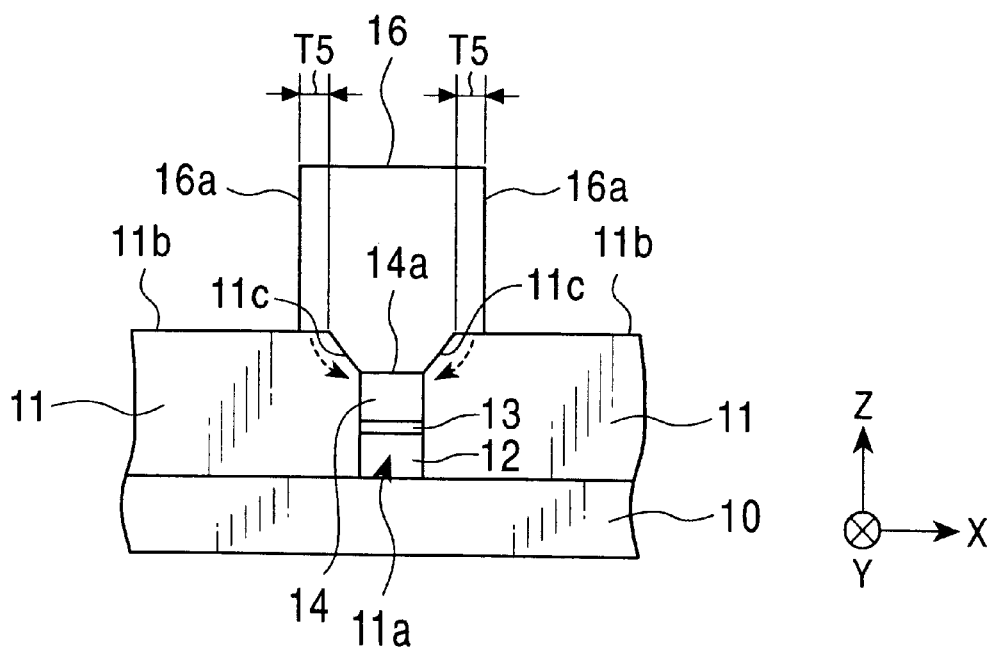
FIG. 6 is a drawing showing a step next to the step shown in FIG. 5.

In the step shown in FIG. 6, the resist layer 20 is removed.

As shown in FIG. 6, the upper core layer 16 extends from the surface 14a of the upper pole layer 14 to the inclined surfaces 11c of the trench 11a formed in the insulating layer 11 and, the side surfaces 16a of the upper core layer 16 extend from the surface 11b of the insulating layer 11 in the direction (the Z direction shown in the drawing) away from the lower core layer 10.

In the state shown in FIG. 6, the upper core layer 16 is formed to extend to the surface 11b of the insulating layer 11. In a product manufactured in this state, a leakage magnetic field (shown by dotted lines) occurs from the portion of the upper core layer 16, which is formed with the width dimension T5 on the surface 11b of the insulating layer 11, toward the inclined surfaces 11c of the trench 11b, thereby causing the problem of write fringing.

Figure 7:
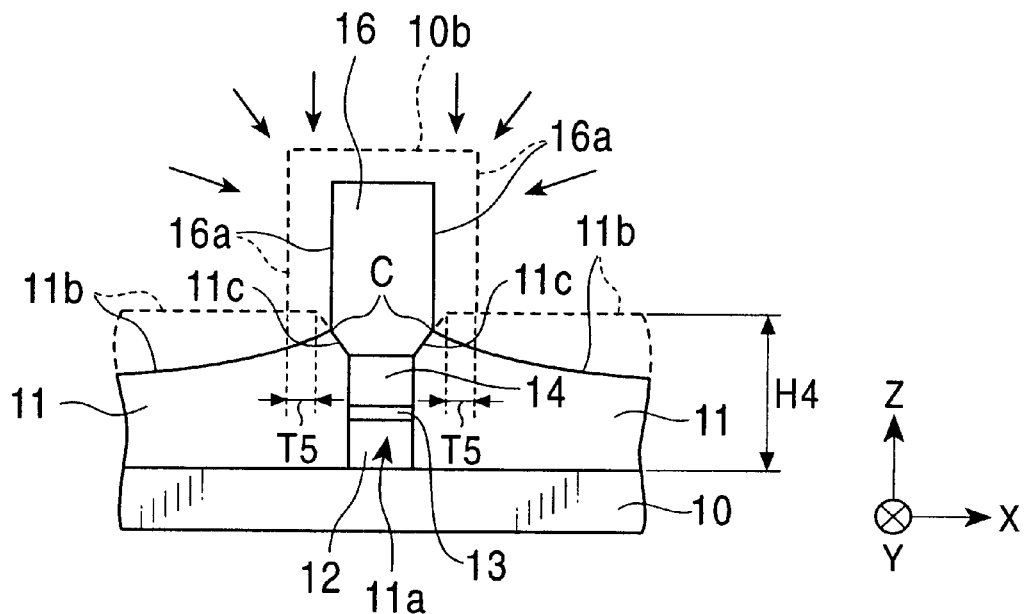
FIG. 7 is a drawing showing a step next to the step shown in FIG. 6.

Therefore, in the present invention, the portion of the upper core layer 16, which is formed on the surface 11b of the insulating layer 11, is removed by, for example, ion milling, as shown in FIG. 7.

As shown in FIG. 7, the side surfaces 16a of the upper core layer 16 are cut so that the side surfaces 16a of the upper core layer 16 are connected to the tops of the inclined surfaces 11c.

The surface 16b of the upper core layer 16 is cut at the same time as ion milling for cutting the side surfaces 16a of the upper core layer 16, and the surface 11b of the insulating layer 11 is also cut.

Namely, the upper core layer 16 and the insulating layer 11 are cut by ion milling, as shown by dotted line in FIG. 7.

As described above, the upper core layer 16 is cut so that the side surfaces 16a thereof are connected to the tops of the inclined surfaces 11c of the trench 11a formed in the insulating layer 11, and at the same time, the surface 11b of the insulating layer 11 is also cut. Therefore, in the state after ion milling, the side surfaces 16a (solid line) of the upper core layer 16 extend from the boundaries C between the inclined surfaces of the trench 11a and the surface 11b (solid line) of the insulating layer 11 in the Z direction shown in the drawing. After ion milling, the upper core layer 16 has no portion formed on the surface 11b of the insulating layer 11.

However, after the side surfaces 16a of the upper core layer 16 is connected to the tops of the inclined surfaces 11c of the trench 11a, the side surfaces 16a of the upper core layer 16 must not be further cut to excessively decrease the width dimension of the upper core layer 16. With the upper core layer having an excessively small width dimension, the problem of magnetic flux saturation occurs. Therefore, the range where the side surfaces 16a of the upper core layer 16 are cut by ion milling is preferably previously set by controlling the ion milling time.

As shown in FIG. 7, the surface 11b (dotted lines) of the insulating layer 11 is also cut by ion milling to form a concavely curved surface 11b (solid lines) after completion of ion milling so that the thickness of the insulating layer 11 gradually decreases from each of the boundaries C between the surface 11b of the insulating layer 11 and the inclined surfaces 11c of the trench 11a in the direction away from the trench 11a.

In the ion milling, the milling rate of the insulating layer 11 is higher than the milling rate of the upper core layer 16, and thus the insulating layer 11 is more cut than the upper core layer 16.

However, as described above, the thickness H4 of the insulating layer 11 is about 1.0 μm to 4.0 μm, and the width dimension T5 of the portion of the upper core layer 16, which is formed on the surface 11b of the insulating layer, is no more than about 0.1 μm. Therefore, even when the side surfaces 16a of the upper core layer are cut by the width dimension T5 or more, the insulating layer 11 side having the thickness H4 is not completely cut to expose the lower core layer 10 formed below the insulating layer 11.

In the present invention, the upper core layer 16 can be formed perpendicularly (the Z direction shown in the drawing) to the planar direction (the X direction shown in the drawing) of the lower core layer 10 by ion milling.

In the manufacturing method of the present invention described in detail above, the resist layer 20 having the space T6 wider than the width dimension T4 (refer to FIG. 4) of the trench 11a on the surface 11b of the insulating layer 11 is formed on the insulating layer 11 to permit the formation of the resist layer having the predetermined shape with high pattern precision. Therefore, the upper core layer 16 can be formed by plating in the space of the resist layer 20 without distortion.

In the present invention, the side surfaces of the upper core layer 16 are cut by ion milling to completely remove the portion of the upper core layer 16 formed on the surface 11b of the insulating layer 11 so that the side surfaces of the upper core layer 16 are connected to the top of the trench 11a of the insulating layer 11. It is thus possible to easily form the upper core layer 16 with high reproducibility, which can suppress the occurrence of write fringing and relieve magnetic flux saturation.

Figure 8:
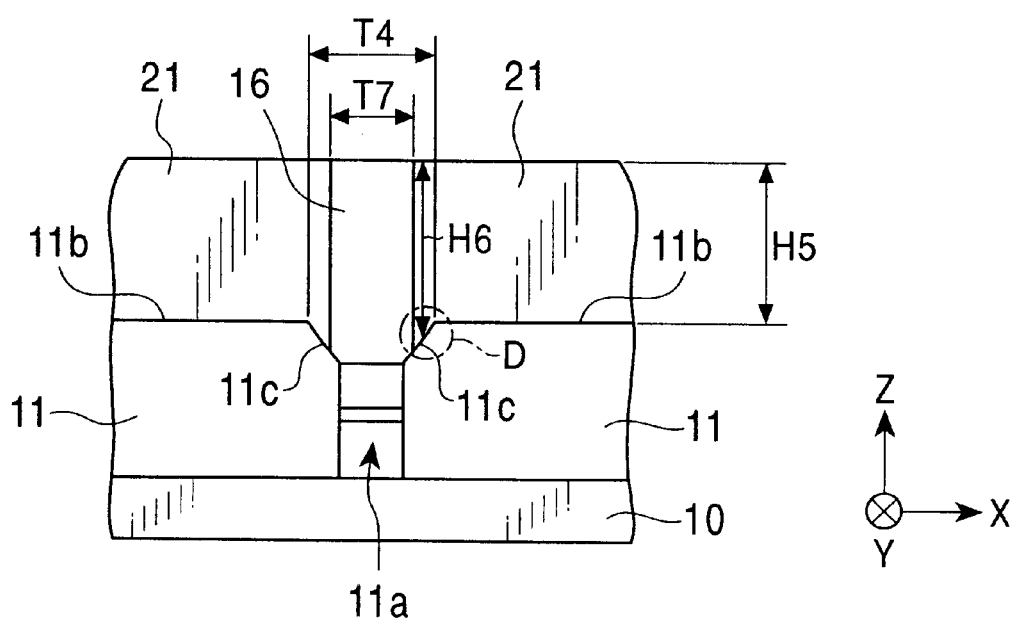
FIG. 8 is a drawing showing a step of another method of manufacturing a thin film magnetic head of the present invention.

FIG. 8 is a drawing showing a step of another method of forming the upper core layer 16 different from the above-described manufacturing method.

In the manufacturing method shown in FIG. 8, a resist layer 21 used for forming the upper core layer 16 is formed on portions of the inclined surfaces 11c formed in the trench 11a of the insulating layer, and on the surface 11b of the insulating layer 11.

Namely, in this embodiment, a space T7 formed in the resist layer 21 is smaller than the width dimension T4 of the trench 11a on the surface 11b of the insulating layer 11.

In the state shown in FIG. 8, the upper core layer 16 is formed in the space of the resist layer 21 by plating, and then the resist layer 21 is removed to form the upper core layer 16 which extends from a portion on the inclined surfaces 11c of the trench 11a in the Z direction shown in FIG. 8. Therefore, unlike in the above-described manufacturing method, the upper core layer 16 is not extended to the surface 11b of the insulating layer 11.

Therefore, the step (refer to FIG. 7) of cutting the side surfaces 16a of the upper core layer 16 by ion milling need not be performed after the upper core layer 16 is formed, thereby simplifying the manufacturing process.

However, in the manufacturing method shown in FIG. 8, the thickness H5 of the resist layer 21 formed on the surface 11b of the insulating layer 11 is smaller than the thickness H6 of the resist layer formed on the inclined surfaces 11c of the trench 11a, and thus irregular reflection occurs due to a difference in focus during exposure development. This causes distortion in a portion (shown by a dotted line D) of the resist layer 21 formed on the inclined surfaces 11c, thereby possibly making unstable the formation and shape of the resist layer 21.

However, the upper core layer 16 formed by the manufacturing method shown in FIG. 8 can sufficiently suppress the occurrence of write fringing and relieve magnetic flux saturation.

Figure 9:
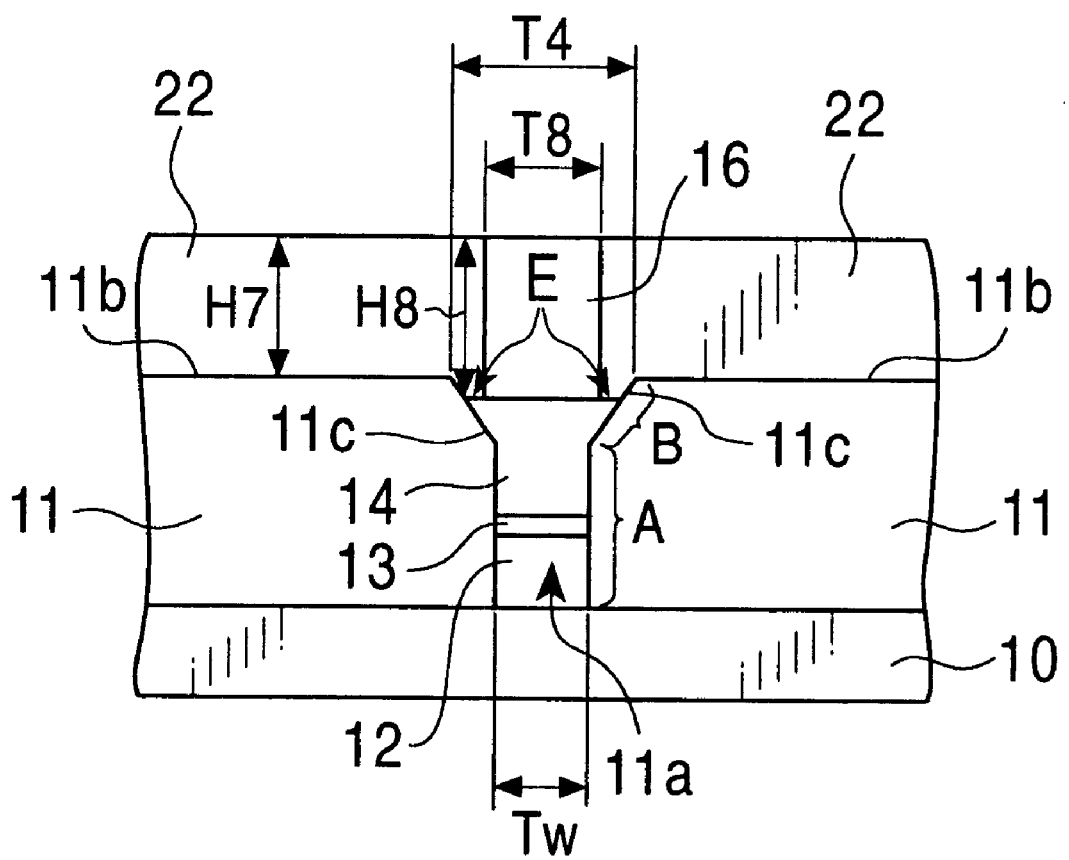
FIG. 9 is a drawing showing a step of a further method of manufacturing a thin film magnetic head of the present invention.
Figure 10:
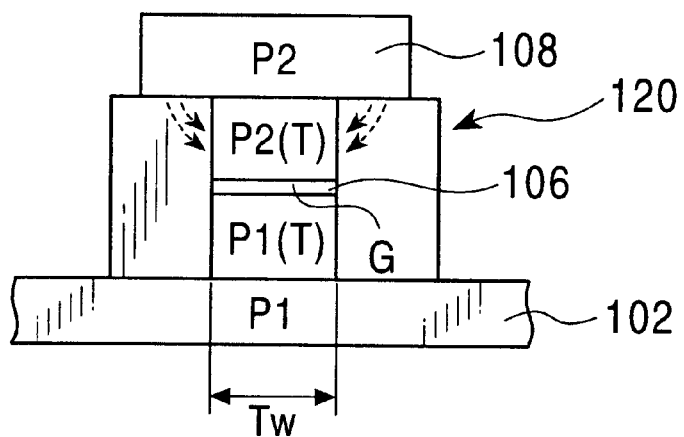
FIG. 10 is a partial front view showing the structure of the ABS of a conventional thin film magnetic head (inductive head)
Figure 11:
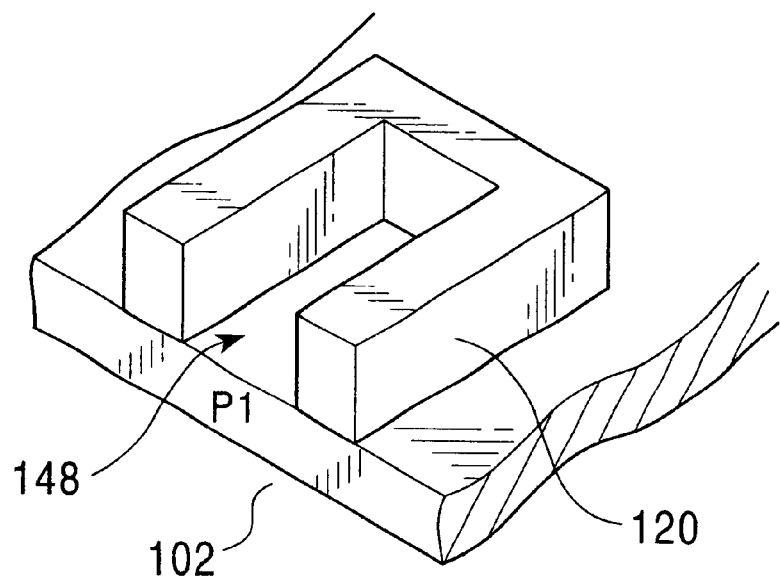
FIG. 11 is a partial perspective view showing the thin film magnetic head shown in FIG. 10.

FIG. 9 is a drawing showing a step of a method of manufacturing a thin film magnetic head in accordance with another embodiment of the present invention.

In this embodiment, an insulating layer 11 is first formed on a lower core layer 10, and a trench 11a is formed in the insulating layer 11. The trench 11a comprises a track-width region A formed with a track width Tw, and an inclined region B having inclined surfaces 11c formed so that the width dimension of the trench 11a gradually increases from both sides of the track-width region A to the surface 11b of the insulating layer 11.

Then, a lower pole layer 11 magnetically connected to the lower core layer 10, a gap layer 13, and an upper pole layer 14 magnetically connected to an upper core layer 16 are formed in turn from below in the trench 11a by plating.

In the embodiment shown in FIG. 9, the upper pole layer 14 is formed not only in the track-width region A but also in the inclined region B.

Then, a resist layer 22 having a predetermined space T8 is formed on the surface 14a of the upper pole layer 14 and the surface 11b of the insulating layer 11.

Then, the upper core layer 16 is formed in the space T8 formed in the resist layer 22 by plating, and the resist layer 22 is removed to complete the thin film magnetic head.

In this embodiment, like in the manufacturing method described above with reference to FIG. 8, the side surfaces 16a of the upper core layer 16 need not be cut by ion milling after being formed in the space of the resist layer 22. In the embodiment shown in FIG. 9, the upper pole layer 14 is formed to extend to the inclined region B, and thus the thickness H8 of the resist layer 22 formed on the surface 14a of the upper pole layer 14 is not much larger than the thickness H7 of the resist layer 22 formed on the surface 11b of the insulating layer 11, thereby causing less irregular reflection due to a difference in focus in exposure development.

Therefore, the embodiment shown in FIG. 9 has the advantages that stability of the formation and shape of the resist layer 22 can be improved, and the upper core layer 16 can easily be formed in the predetermined shape, as compared with the embodiment shown in FIG. 8.

However, where the space T8 of the resist layer 22 formed on the surface 14a of the upper pole layer 14 and the surface 11b of the insulating layer is excessively small, a step E is formed between the upper core layer 16 formed in the space of the resist layer 22 and the upper pole layer 14. The presence of this step E readily causes the occurrence of a leakage magnetic field between the upper core layer 16 and the upper pole layer 14.

In order to decrease the occurrence of such a leakage magnetic field, the space T8 of the resist layer 22 is preferably increased as much as possible to decrease the step E formed between the upper core layer 16 and the upper pole layer 14. The space T8 of the resist layer 22 must be smaller than at least the width dimension T4 of the trench 11a on the surface 11b of the insulating layer 11.

If the space T8 of the resist layer 22 is larger than the width dimension T4, the upper core layer 16 is formed to extend to the surface 11b of the insulating layer 11, and thus like in the step shown in FIG. 7, the portion of the upper core layer 16 formed on the surface 11b of the insulating layer 11 must be cut by ion milling.

In the present invention, the method of forming the trench 11a in the insulating layer 11 is not limited. The trench 11a may be formed any method as long as the trench 11a comprises the track-width region A formed with the track width Tw and the inclined region B having the inclined surfaces 11c formed so that the width dimension of the trench 11a gradually increases from both side ends of the track-width region A to the surface 11b of the insulating layer 11.

Figure 12:
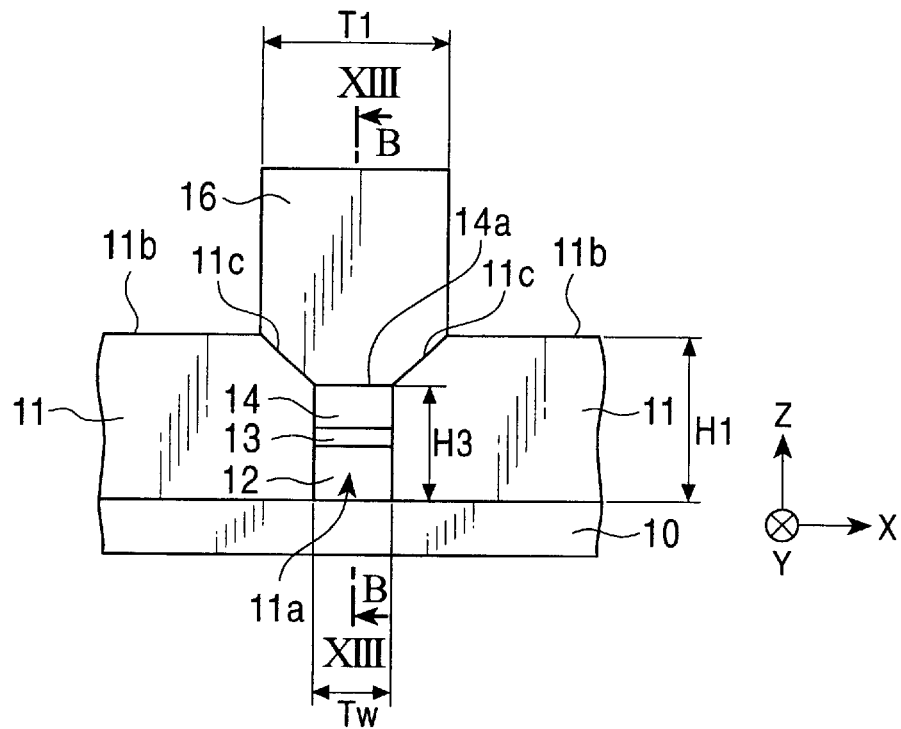
FIG. 12 is a partial front view showing the structure of the ABS of a thin film magnetic head (inductive head) in accordance with a further embodiment of the present invention.
Figure 13:
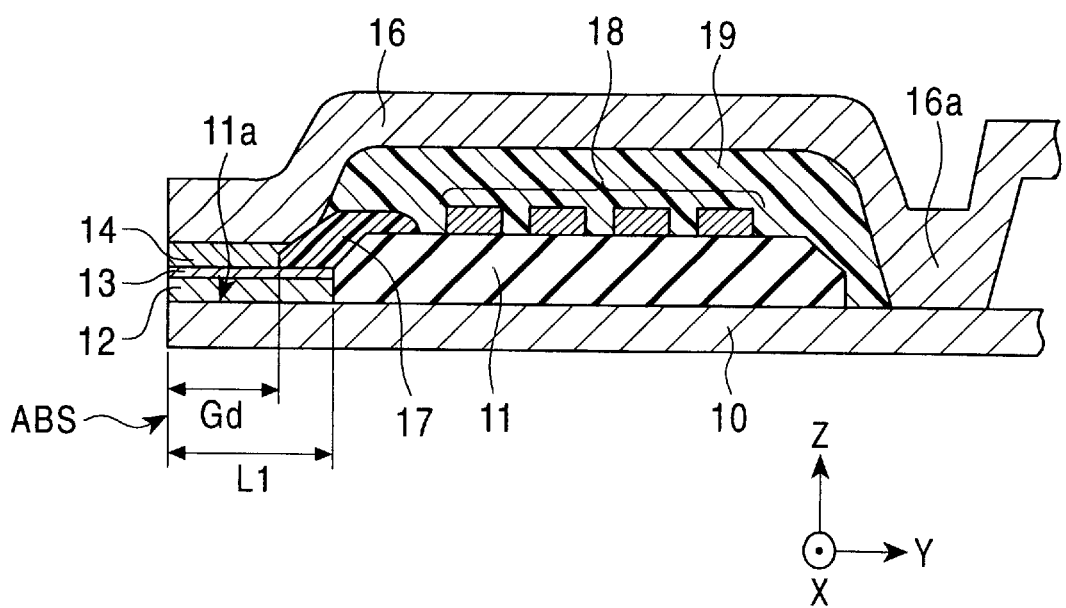
FIG. 13 is a partial sectional view of the thin film magnetic head taken along line XIII—XIII in FIG. 12, as viewed from the B direction.

FIG. 12 is a partial front view showing the structure of a thin film magnetic head of the present invention, and FIG. 13 is a partial sectional view of the thin film magnetic head taken along line XIII—XIII in FIG. 12, as viewed from the B direction.

The thin film magnetic head shown in FIGS. 12 and 13 is a write inductive head which is laminated on, for example, a read head which utilizes a magnetoresistive effect.

The read head comprises a magnetoresistive element comprising a GMR element which utilizes a giant magnetoresistive effect, for example, such as a spin valve film, or an AMR element which utilizes an anisotropic magnetoresistive effect, and shielding layers formed above and below the magnetoresistive effect with gap layers provided therebetween.

In FIGS. 12 and 13, reference numeral 10 denotes a lower core layer made of a soft magnetic material having high magnetic permeability, such as a Fe—Ni alloy (permalloy) or the like.

In the present invention, as shown in FIGS. 12 and 13, an insulating layer 11 made of an insulating material is formed on the lower core layer 10. The insulating material comprises at least one of AlO, $Al_2O_3$, $SiO_2$, $Ta_2O_5$, TiO, AlN, AlSiN, TiN, SiN, $Si_3N_4$, NiO, WO, $WO_3$, BN, and CrN, and the insulating layer 11 is either single-layered or multilayered.

In the present invention, a trench 11a is formed in the insulating layer 11 with the predetermined length L1 from the surface (ABS) facing the recording medium in the height direction (the Y direction shown in the drawings).

The trench 11a is formed by, for example, reactive ion etching (RIE) as described below in the manufacturing method. The trench 11a formed in the insulating layer 11 has a small width dimension.

As shown in FIG. 12, the width dimension of the trench 11a formed in the insulating layer 11 is substantially defined as the track width Tw which is preferably 1.0 $\mu$m or less, more preferably 0.7 $\mu$m or less.

As shown in FIGS. 12 and 13, a lower pole layer 12 magnetically connected to the lower core layer 10 is formed as a lowermost layer in the trench 11a formed in the insulating layer 11.

Although the lower pole layer 12 is made of a magnetic material such as permalloy or the like, the material of the lower pole layer 12 may be the same as or different from the material of the lower core layer 10. The lower pole layer 12 is formed in the trench 11a by electroplating. The lower pole layer 12 can be formed in a rectangular shape to a uniform thickness in the trench 11a by electroplating, with less causing distortion in the plane (the surface).

As shown in FIGS. 12 and 13, a gap layer 13 is laminated on the lower pole layer 12 in the trench 11a.

In the present invention, the gap layer 13 is made of a nonmagnetic metal material, and preferably formed in the trench 11a by electroplating. The gap layer 13 can be formed to a uniform thickness on the lower pole layer 12 by electroplating, with less causing distortion in the surface of the gap layer.

In the present invention, as the nonmagnetic metal material, at least one material is preferably selected from NiP, NiPd, NiPt, NiRh, NiW, NiMo, Au. Pt. Rh, Pd, Ru, and Cr, and the gap layer 13 may comprise either a single layer film or a multilayer film.

As shown in FIGS. 12 and 13, an upper pole layer 14 is laminated on the gap layer 13 in the trench 11a. The upper pole layer 14 is magnetically connected to a upper core layer 16 described below, and is formed by plating a magnetic material such as permalloy or the like in the same manner as the lower pole layer 12. The upper pole layer 14 may comprise the same material as or a different material from the upper core layer 16.

As shown in FIG. 12, the upper pole layer 14 is formed to a height lower than the surface 11b of the insulating layer 11. Namely, the total thickness H3 of the lower pole layer 12, the gap layer 13 and the upper pole layer 14 is smaller than the thickness dimension H1 of the insulating layer 11.

However, with the insulating layer 11 having an excessively large thickness dimension H1, there is the problem of causing difficulties in forming the trench 11a with the small track width Tw in the insulating layer 11 with high pattern precision. In the present invention, the thickness dimension H1 is preferably about 1.0 $\mu$m to 4.0 $\mu$m.

In the present invention, inclined surfaces 11c are formed in the insulating layer 11 on both sides of the upper pole layer 14 so as to be inclined to gradually increase the distance therebetween from the surface 14a of the upper pole layer 14 to the surface 11b of the insulating layer 11. The insulating layer 11 is formed by ion milling as described below with reference to the manufacturing method.

In the present invention, as shown in FIG. 12, the upper core layer 16 is formed to extend from the upper pole layer 14 to the inclined surfaces 11c. The upper core layer 16 is formed to have a maximum width dimension T1 and further extend perpendicularly from the boundaries between the inclined surfaces 11c and the surface 11b of the insulating layer 11 in the Z direction shown in the drawing. The upper core layer 16 is made of a magnetic material such as permalloy or the like, and may be formed by frame plating in the same manner as conventional methods.

As shown in FIG. 12, the upper core layer 16 is formed to have the width dimension T1 which is larger than the track width Tw. Therefore, the upper core layer 16 can easily securely be formed in the predetermined shape by frame plating, as compared with a conventional method in which the width of the front end of the upper core layer 16, which is exposed in the ABS, is defined as the track width Tw, and the front end must be formed with the small track width Tw. In the present invention, as shown in FIG. 13, a predetermined gap (Gd) is formed on the gap layer 13 formed in the trench 11a of the insulating layer 11 in the height direction (the Y direction shown in the drawing) from the ABS, and a Gd determining insulating layer 17 is formed on the gap layer 13 with the gap Gd from the ABS to extend backward to the insulating layer 11 in the height direction. The Gd determining insulating layer 17 is made of an organic resin material, for example, such as polyimide, a resist material, or the like.

The Gd determining layer 17 is provided for determining the gap depth (Gd) which has a significant influence on the electric properties of the thin film magnetic head, and must thus be set to an appropriate length dimension.

In the present invention, in order to set the gap depth Gd to the predetermined length dimension, the Gd determining insulating layer 17 is formed on the gap layer 13. However, in a further embodiment of the present invention, where the length dimension L1 of the trench 11a formed in the insulating layer 11 is set to the gap depth Gd, the length dimension L1 of the trench 11a coincides with the gap depth Gd. In this case, the Gd determining insulating layer 17 need not be formed. After the Gd determining insulating layer 17 is formed in the trench 11a to set the gap depth Gd, the lower pole layer 12, the gap layer 13 and the upper pole layer 14 are continuously formed in the trench 11a by plating.

As shown in FIG. 13, a coil layer 18 is spirally formed by patterning on the portion of the insulating layer 11 which i s located at the back of the trench 11a of the insulating layer 11 in the height direction. Although, in the embodiment shown in FIG. 13, the coil layer 18 is formed directly on the insulating layer 11, the Gd determining insulating layer 17 may be formed between the coil layer 18 and the insulating layer 11.

A coil insulating layer 19 is further formed on t he coil layer 18 to cove r the coil layer 18. The coil insulating layer 19 is made of an organic resin material such as a resist material, polyimide, or the like.

As shown in FIG. 13, an upper core layer 16 is formed to extend from the ABS side in the height direction, the base end 16c of the upper core layer 16 being magnetically connected to the lower core layer 10.

Figure 14:
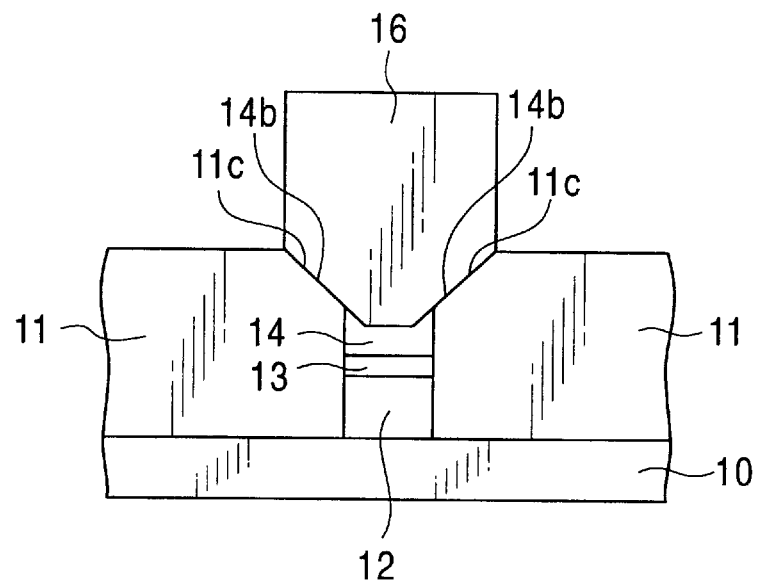
FIG. 14 is a partial front view showing the structure of the ABS of a thin film magnetic head (inductive head) in accordance with a still further embodiment of the present invention.

FIG. 14 is a partial front view showing the structure of a thin film magnetic head in accordance with a further embodiment of the present invention, as viewed from the surface opposed to the recording medium.

In this embodiment, as shown in FIG. 14, the upper core layer 16 is formed on th e upper pole layer 14 to extend from the inclined surfaces 14b formed in the upper pole layer to the inclined surfaces 11c formed in the insulating layer 11.

As in this embodiment, in order to form the inclined surfaces 14b in the upper pole layer 14 so that the inclines surfaces 14b are connected to the inclined surfaces 11c formed in the insulating layer 11, the time required for ion milling used for forming the inclined surfaces 11c of the insulating layer 11 may be appropriately controlled.

In the inductive head of the present invention, when a recording current is supplied to the coil layer 18, a recording magnetic field is induced in the lower core layer 10 and the upper core layer 16 to produce a leakage magnetic field between the lower pole layer 12 and the upper pole layer 14 which are opposed to each other with the gap layer 13 provided therebetween, thereby recording a magnetic signal on the recording medium such as a hard disk by the leakage magnetic field.

As described in detail above, the trench 11a is formed in the insulating layer 11 formed on the lower core layer 10. In the present invention, the trench 11a can be formed with a width dimension, which coincides with the small track width Tw of 1.0 μm or less, by reactive ion etching or the like.

The lower pole layer 12 magnetically connected to the lower core layer 10, and the upper pole layer 14 magnetically connected to the upper core layer 16 are formed with the gap layer 13 provided therebetween in the trench 11a formed with the track width Tw. Therefore, a leakage magnetic field produced between the upper pole layer 14 and the lower pole layer 12 can be received in the track width Tw of 1.0 m or less, thereby permitting manufacture of a thin film magnetic head adaptable to a further increase in recording density in future.

As shown in FIGS. 12 and 14, the width dimension Ti of the upper core layer 16 formed on the upper pole layer 14 is larger than th e t rack width Tw, suppressing magnetic saturation in the vicinity of the tip of the upper core layer 16.

In addition, the inclined surfaces 11c are formed in the insulating layer 11, and the upper core layer 16 is formed on the inclined surfaces 11c, thereby appropriately separating the upper core layer 16 formed on the inclined surfaces 11c from the lower pole layer 12. It is thus possible to appropriately prevent the occurrence of write fringing.

Particularly, by the manufacturing method of the present invention below, the inclined surfaces 11 can be precisely formed in the predetermined shape in the insulating layer 11.

FIGS. 15 to 22 are drawings respectively showing the steps of the method of forming the inclined surfaces 11c in the insulating layer 11 in accordance with the present invention. FIGS. 15 to 18 are partial perspective views respectively showing the steps, and FIGS. 19 to 22 are partial front views respectively showing the steps.

Figure 15:
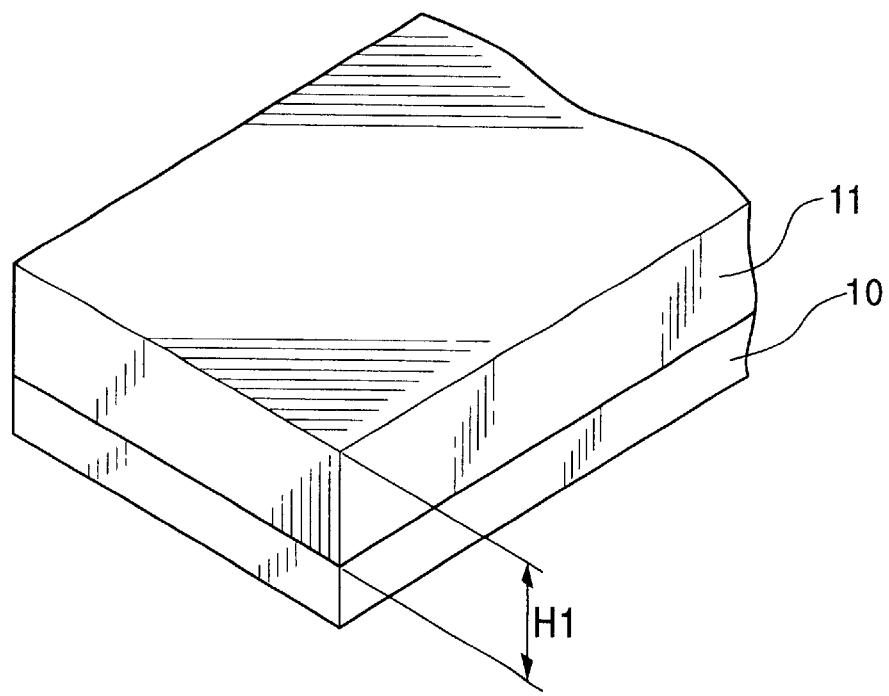
FIG. 15 is a drawing showing a step of a still further method of manufacturing a thin film magnetic head of the present invention.

In FIG. 15, the lower core layer 10 is formed on a substrate (not shown), and the insulating layer 11 is further formed on the lower core layer 10.

As the insulating material used for the insulating layer 11, at least one material is selected from AlO, $Al_2O_3$, $SiO_2$, $Ta_2O_5$, TiO, AlN, AlSiN, TiN, SiN, $Si_3N_4$, NiO, WO, $WO_3$, BN, and CrN. The insulating layer 11 comprises either a single layer or a plurality of layers, and is formed by sputtering or evaporation.

The insulating layer 11 has the thickness dimension H1 which is preferably about 1.0 μm to 4.0 μm.

Figure 16:
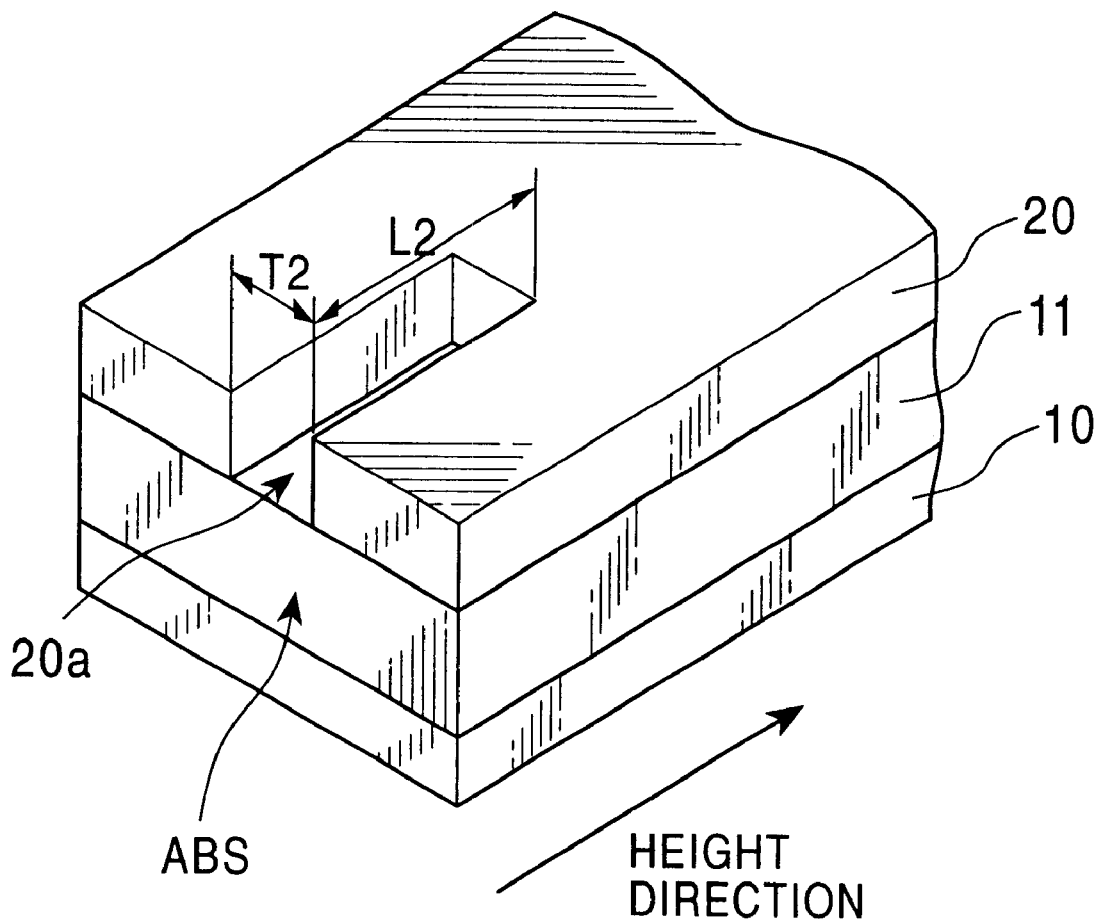
FIG. 16 is a drawing showing a step next to the step shown in FIG. 15.

Next, as shown in FIG. 16, a resist material is coated on the insulating layer 11 by spin coating, and a rectangular trench 20a is then formed in the resist layer 20 formed on the insulating layer 11 by exposure development patterning so that the trench 20a extends from the ABS in the height direction.

As shown in FIG. 16, the trench 20a formed in the resist layer 20 has a width dimension T2, and a length dimension L2.

In the present invention, the width dimension T2 of the trench 20a is substantially the same as the track width Tw, and the width dimension T2 is preferably 1.0 μm or less, more preferably 0.7 μm or less.

The length dimension L2 of the trench 20a is substantially the same as the gap depth Gd, or longer than the gap depth Gd.

Figure 17:
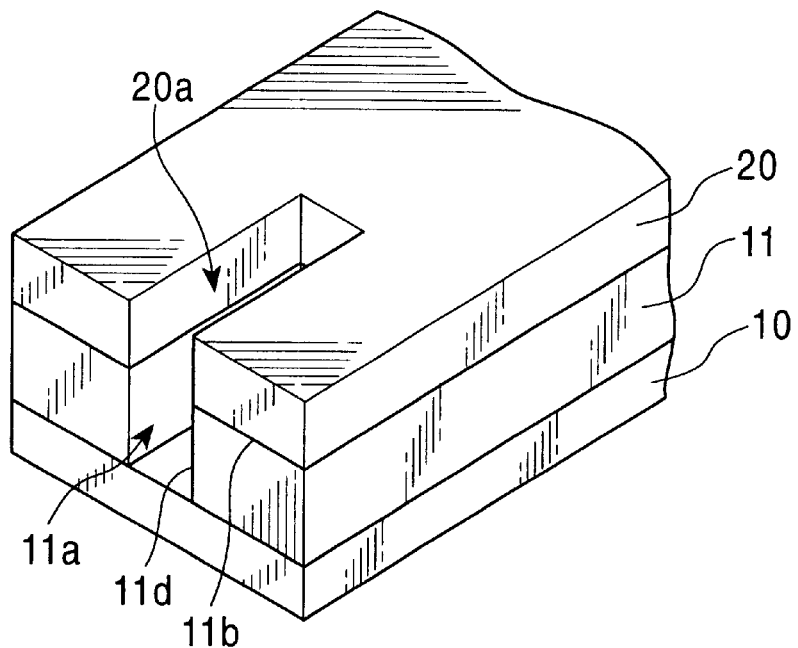
FIG. 17 is a drawing showing a step next to the step shown in FIG. 16.

In the step shown in FIG. 17, the portion of the insulating layer 11 which is not covered with the resist layer 20 is removed by anisotropic etching to form the trench 11a in the insulating layer 11, which has substantially same shape as the trench 20a formed in the resist layer 20. As the anisotropic etching, for example, reactive ion etching (RIE) can be used.

The trench 11a formed by anisotropic etching is formed perpendicularly to the surface 11b of the insulating layer 11, and the angle formed by the side surfaces 11d of the trench 11a and the surface 11b of the insulating layer 11 is about 83° to 90°.

Figure 18:
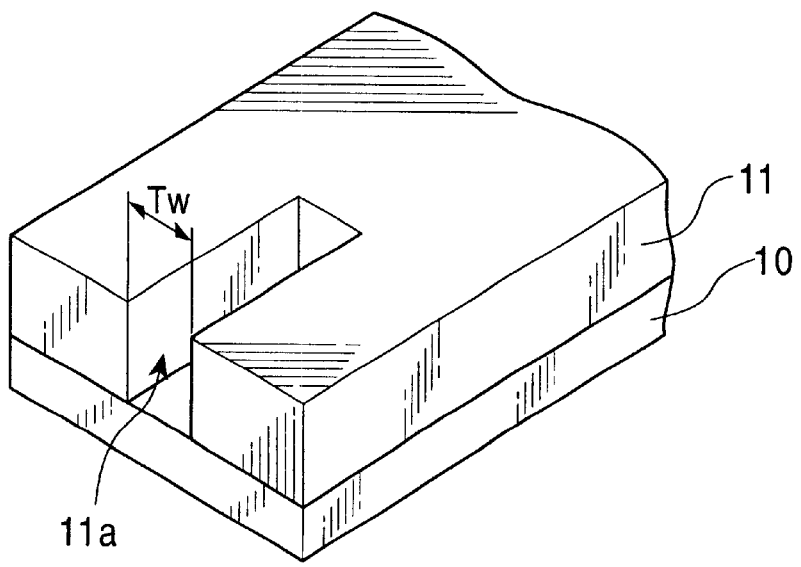
FIG. 18 is a drawing showing a step next to the step shown in FIG. 17.

FIG. 18 shows the state where the resist layer 20 is removed. The trench 11a formed in the insulating layer 11 as described above has a width dimension coinciding with the track width Tw. Particularly, in the present invention, the track width Tw is 1.0 μm or less, preferably 0.7 μm or less.

Figure 19:
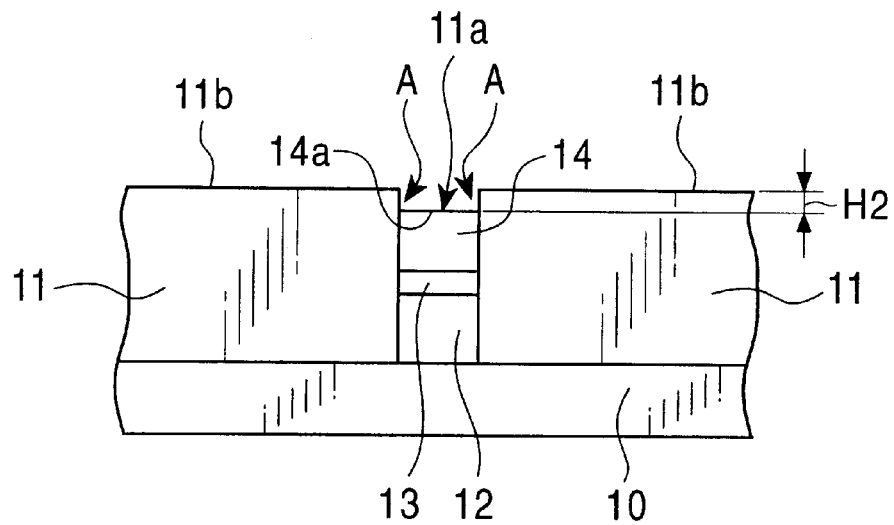
FIG. 19 is a drawing showing a step next to the step shown in FIG. 18.

Next, as shown in FIG. 19, the lower pole layer 12 magnetically connected to the lower core layer 10 is formed, by plating, in the trench 11a formed in the insulating layer 11. By plating, the lower pole layer 12 can be formed to a uniform thickness without causing distortion on the surface thereof.

The magnetic material used for the lower pole layer 12 may be the same as or different from the magnetic material used for forming the lower core layer 10.

Then, as shown in FIG. 19, the gap layer 13 is formed on the lower pole layer 12 in the trench 11a.

In the present invention, the gap layer 13 is preferably made of a nonmagnetic metal material, and at least one material is preferably selected from NiP, NiPd, NiPt, NiRh, NiW, NiMo, Au, Pt, Rh, Pd, Ru, and Cr. The gap layer 13 may comprise either a single layer film or a multilayer film.

Since the gap layer 13 is made of a nonmagnetic metal material, as described above, the gap layer 13 can be formed to a uniform thickness on the lower pole layer 12 in the trench 11a by plating, without causing distortion on the surface.

Furthermore, the upper pole layer 14 is formed on the gap layer 16 in the trench 11a by plating. The upper pole layer 14 is magnetically connected to the upper core layer described below, and the material of the upper pole layer 16 may be the same as or different from the upper core layer.

The upper pole layer 14 is preferably formed in the trench 11a by plating so that the trench 11a formed in the insulating layer 11 is not completely closed by forming the upper pole layer 14, and the position of the surface 14a of the upper pole layer 14 is lower than the surface 11b of the insulating layer 11, to form steps A between the surface 14a of the upper pole layer 14 and the surface 11b of the insulating layer 11.

By forming the steps A, the inclined surfaces 11c can easily and securely formed in the insulating layer 11 in the next step. However, the height H2 of the steps A is preferably not so high.

Specifically, the height dimension H2 of the steps A is preferably 0.1 to 0.5 μm.

With the steps A having an excessively large height H2, the resist layer 21 cannot be formed to a uniform thickness on the insulating layer in the next step, thereby causing a problem in which the trench 21a cannot be formed in the resist layer 21 with high pattern precision.

In the present invention, the upper pole layer 14 may be formed to substantially the same height as the surface 11b of the insulating layer 11 to completely close the trench 11a by forming the upper pole layer 14.

Figure 20:
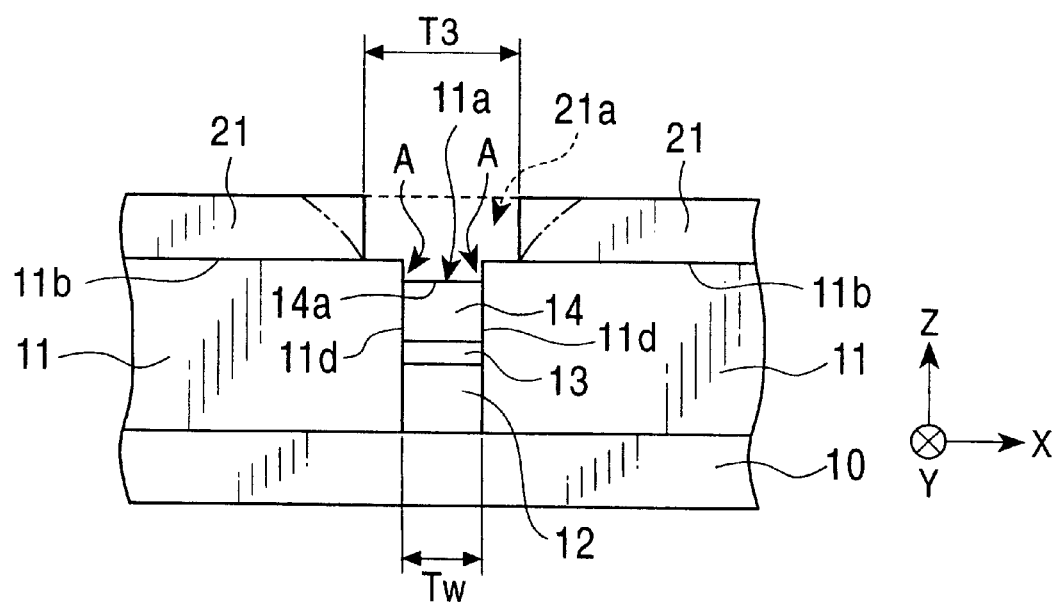
FIG. 20 is a drawing showing a step next to the step shown in FIG. 19.

In the step shown in FIG. 20, a resist material is coated on the insulating layer 11 by spin coating or the like.

Although, in the present invention, the slight steps A are formed between the surface 14a of the upper pole layer 14 and the surface 11b of the insulating layer 11, as described above, the trench 11a formed in the insulating layer 11 is filled with the lower pole layer 12, the gap layer 13, and the upper pole layer 14. Therefore, the surface including the surface 14a of the upper pole layer 14 and the surface 11b of the insulating layer 11, on which the resist material is coated, is made substantially flat.

In the present invention, the resist material to be coated on the insulating layer 11 and the upper pole layer 14 can thus be coated on the substantially flat surface. Therefore, the resist layer 21 can be formed to a substantially uniform thickness on the insulating layer 11 and the upper pole layer 14.

As shown in FIG. 20, a portion 21a of the resist layer 21 formed on the upper pole layer 14 is removed by exposure development to form the trench 21a in the resist layer 21, which extends) from the ABS in the height direction (the perpendicular direction to the drawing).

The trench 21a has a width dimension T3 which is larger than at least the track width Tw. The length dimension of the trench 21a in the height direction is the same as or longer than the length dimension L1 (refer to FIG. 13) of the trench 11a formed in the insulating layer 11 in the height direction.

As described above, by forming the trench 21a in the resist layer 21, the resist layer 21 formed on the insulating layer 11 is divided into two portions on both sides of the trench 11a in which the lower pole layer 12, the gap layer 13, and the upper pole layer 14 are formed, as viewed from the ABS side.

Since the width dimension T3 of the trench 21a formed in the resist layer 21 is larger than the track width Tw, not only the surface of the upper pole layer 14 but also portions of the surface of the insulating layer 11, which are located on both sides of the upper pole layer 14, are exposed in the trench 21a.

In the present invention, since the resist layer 21 can be formed to a substantially uniform thickness on the substantially flat surface, as described above, the focus is substantially the same at any position in forming the trench 21a in the resist layer 21 by exposure development, whereby the pattern of the trench 21a can be precisely formed in the resist layer 21.

As described above, in the present invention, the trench 11a formed in the insulating layer 11 is previously filled by laminating the lower pole layer 12, the gap layer 13, and the upper pole layer 14 therein, thereby permitting the formation of the resist layer 21 to a uniform thickness on the insulating layer 11, and the formation of the trench 21a in the resist layer 21 with high pattern precision. The trench 11a is formed in the insulating layer 11 in the perpendicular direction (the Z direction shown in the drawings), and the sides 11d of the trench 11a are at about 90° with respect to the surface 11b of the insulating layer 11. Therefore, in forming the trench 21a in the resist layer 21, alignment precision can be improved, and the symmetrical trench 21a can be formed in the resist layer 21.

Figure 21:
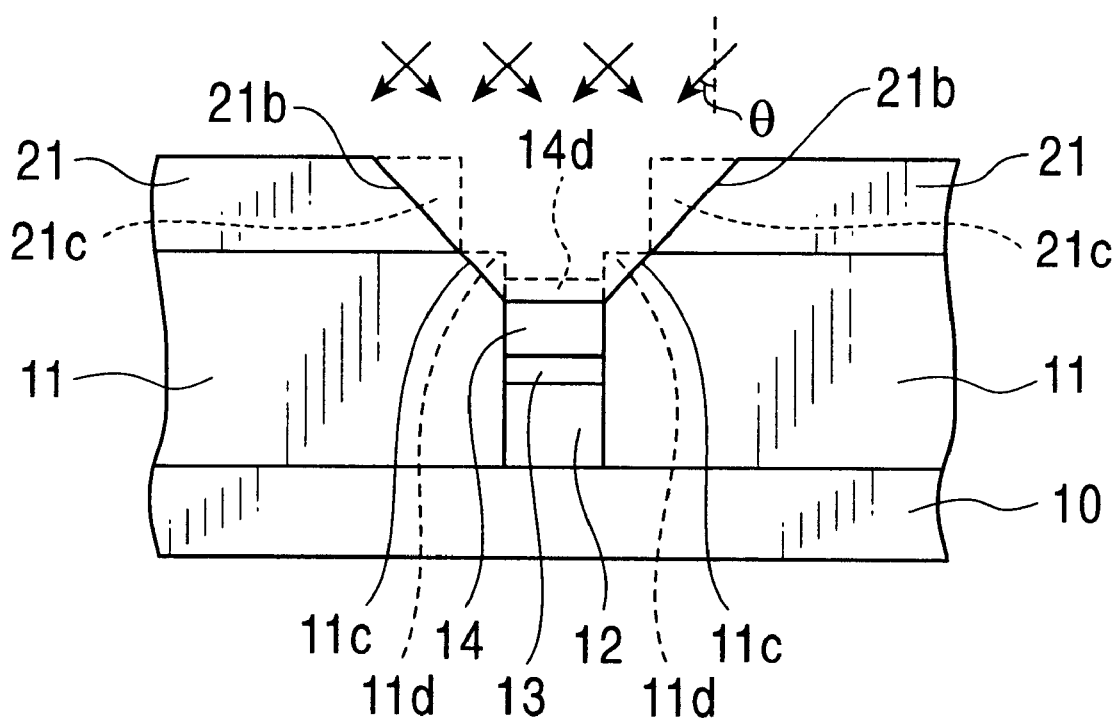
FIG. 21 is a drawing showing a step next to the step shown in FIG. 20.

In the step shown in FIG. 21, the surfaces of the upper pole layer 14 and the insulating layer 11, which are exposed in the trench 21a formed in the resist layer 21, are etched by ion milling.

By ion milling, portions 21c of the resist layer, which are shown by dotted lines in FIG. 21, and portions 11d of the insulating layer 11, which are shown by dotted lines, are obliquely cut to continuously form inclined surfaces 21b and inclined surfaces 11c in the resist layer 21 and the insulating layer 11.

A portion 14d of the upper pole layer 14, which is shown by a dotted line, is also removed by ion milling. In the ion milling, the etching rate of the upper pole layer 14 made of permalloy or the like is substantially the same as or slightly lower than the etching rate of the insulating layer 11 made of, for example, $SiO_2$ or the like. After development, the resist layer 21 may be subjected to post baking (heat treatment) to taper (shown by one-dot chain lines in FIG. 20) the surface of the resist layer 21, so that the shadow effect of ion milling is suppressed.

As described above, in the present invention, the inclines surfaces 11c can be formed in the insulating layer 11 on both sides of the upper pole layer 14 by ion milling so that the distance gradually increases from the surface 14a of the upper pole layer 14 to the surface 11b of the insulating layer 11.

As described above, the resist layer 21 can be formed to a substantially uniform thickness on the insulating layer 11, and the trench 21a can thus be formed in the resist layer 21 with high pattern precision.

Therefore, in the present invention, the inclined surfaces 11c having the predetermined shape can be formed, with high reproducibility, in the portions of the insulating layer 11, which are exposed in the trench 21a formed in the resist layer 21, causing less a variation in the shape of the inclined surfaces 11c.

Particularly, in the present invention, as shown in FIG. 20, the surface 14a of the upper pole layer 14 is lower than the surface 11b of the insulating layer 11, and the steps A are deliberately formed between the surface 14a of the upper pole layer 14 and the surface 11b of the insulating layer 11. Therefore, the insulating layer 11 is cut at the steps A by ion milling to facilitate the formation of the inclined surfaces 11c in the insulating layer 11.

Figure 22:
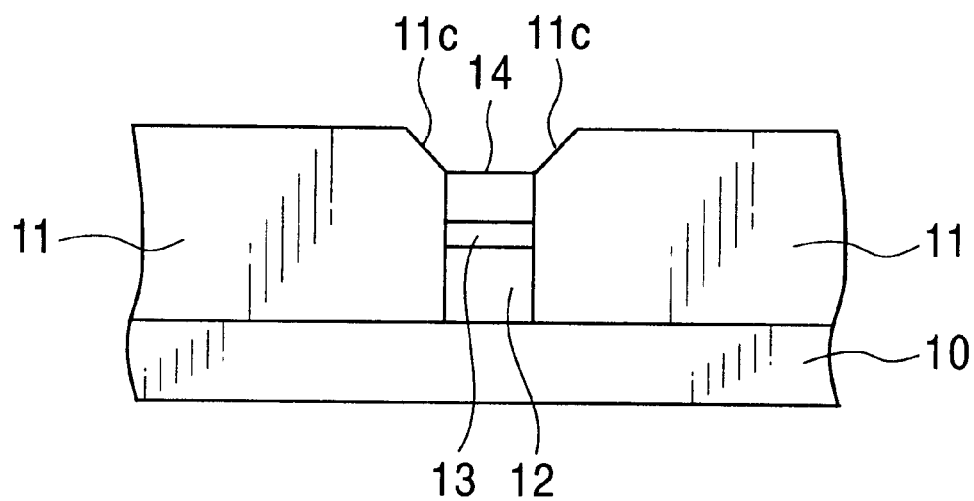
FIG. 22 is a drawing showing a step next to the step shown in FIG. 21.

After the inclined surfaces 11 are formed, the resist layer 21 formed on the insulating layer 11 is removed (refer to FIG. 22), and the upper core layer 16 is further formed on the upper pole layer 14 and the inclined surfaces 11c of the insulating layer 11, shown in FIG. 22, by frame plating to complete the inductive head shown in FIG. 12.

As described above, in the present invention, the inclined surfaces 11c are precisely formed in the predetermined shape in the insulating layer 11, thereby causing less variations in the shape of the inclined surfaces 11 of products. Therefore, in all products, the upper core layer 16 formed on the inclined surfaces 11c can be appropriately separated from the lower pole layer 12 (refer to FIG. 12) with a predetermined distance therebetween, and thus inductive heads causing less write fringing can be formed with high yield.

In order to change the angle of the inclined surfaces 11c formed in the insulating layer 11, the angle θ of ion milling shown in FIG. 21, the position or thickness of the resist layer 21 may be appropriately controlled.

Figure 23:
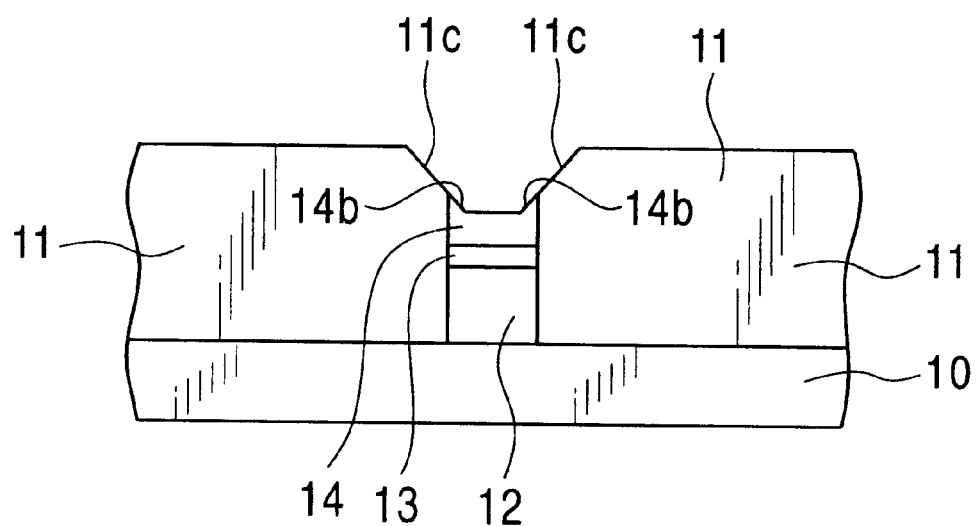
FIG. 23 is a drawing showing a step for manufacturing a thin film magnetic head formed in a shape different from that of the thin film magnetic head shown in FIG. 22.
Figure 24:
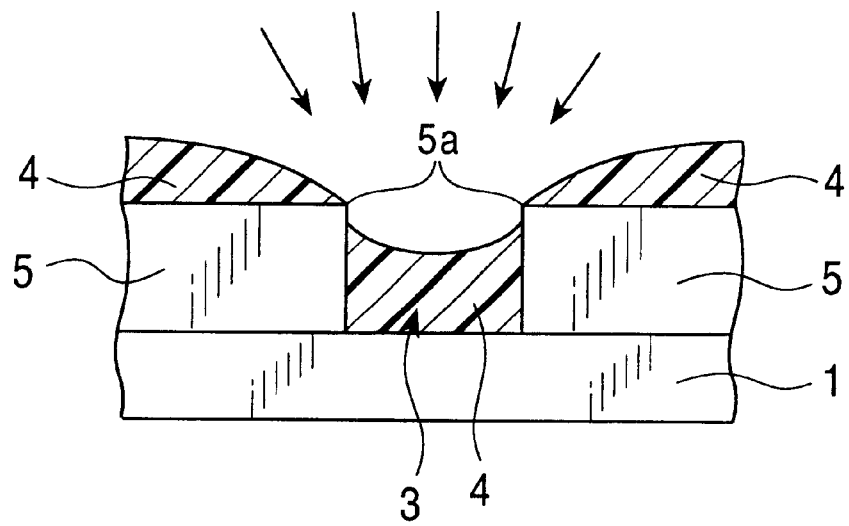
FIG. 24 is a drawing showing a step of a conventional method of manufacturing a thin film magnetic head.
Figure 25:
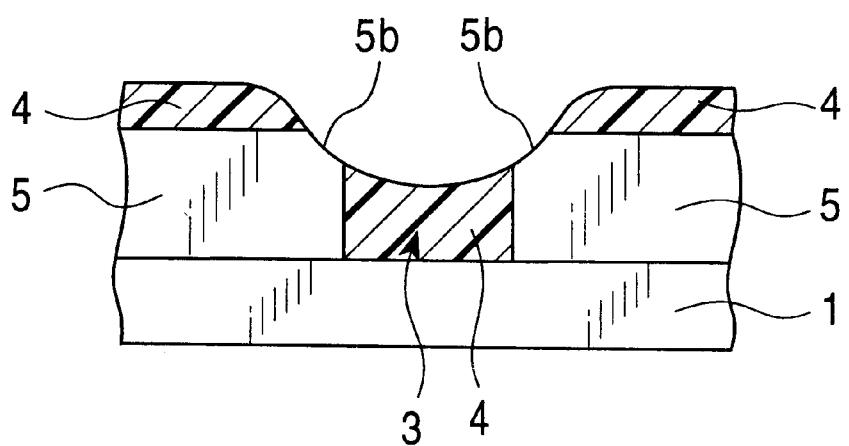
FIG. 25 is a drawing showing a step next to the step shown in FIG. 24.

The angle θ of ion milling shown in FIG. 21, the position or thickness of the resist layer 21, or the ion milling time may be appropriately controlled to continuously form inclined surfaces 14b in the upper pole layer 14, which are connected to the inclined surfaces 11c of the insulating layer 11, as shown in FIG. 23.

Then, the upper core layer 16 is formed on the upper pole layer 14 and the inclined surfaces 11 of the insulating layer 11 shown in FIG. 23 by frame plating.

In the present invention, the upper core layer 16 formed on the upper pole layer 14 and the inclined surfaces 11c of the insulating layer 11 shown in FIG. 22 and 23 may be formed in any desired shape by any method.

In forming the Gd determining insulating layer 17 shown in FIG. 13, after the gap layer 13 shown in FIG. 19 is formed in the trench 11a of the insulating layer 11, the Gd determining insulating layer 17 is formed on the gap layer 13, and then the upper pole layer 14 is formed on the gap layer 13 and the Gd determining insulating layer 17. The subsequent steps are the same as the above-described steps shown in FIGS. 20 to 22.

As described above, in the present invention, a trench of an insulating layer formed on a lower core layer comprises a track-width region which defines the track width from the lower core layer to the predetermined height, and an inclined region having inclined surfaces formed to gradually increase the width dimension of the trench from the upper edge of the track-width region to the surface of the insulating layer. Furthermore, an upper core layer is formed on the inclined surfaces in the direction away from the lower core layer.

Therefore, in the present invention, the upper core layer is formed on the inclined surfaces which are formed to gradually increase the width dimension of the trench of the insulating layer, and thus the width dimension of the upper core layer can be set to be larger than the track width Tw. It is thus possible to suppress magnetic flux saturation, and appropriately separate the upper core layer from a lower pole layer formed in the track-width region of the trench to be magnetically connected to the lower core layer, thereby appropriately suppressing the occurrence of write fringing.

In the manufacturing method of the present invention, a resist layer necessary for forming the upper core layer, which has a space wider than the width dimension of the trench formed in the insulating layer, is formed by exposure development.

Namely, in the present invention, the coated resist layer is removed from the trench of the insulating layer to leave the resist layer having a substantially uniform thickness only on the flat surface of the insulating layer. Therefore, irregular reflection less occurs due to a difference in focus in exposure development, and the resist layer can be formed in a stable shape on the surface of the insulating layer. The upper core layer is formed in the space of the resist layer, and then portions of the upper core layer which are formed on the surface of the insulating layer, are etched out by ion milling to complete the upper core layer having the predetermined shape.

In the manufacturing method of the present invention, the upper core layer, which has a significant influence on the problem of write fringing and magnetic flux saturation, can easily be formed in the predetermined shape with high reproducibility, thereby improving yield.

As described above, in the present invention, the insulating layer having the trench formed with the track width Tw is formed on the lower core layer, and then the lower pole layer, the gap layer and the upper pole layer are continuously formed in the trench by plating.

In this way, the trench formed in the insulating layer is filled with the lower pole layer, the gap layer and the upper pole layer to make substantially flat the surfaces of the insulating layer and the upper pole layer. Therefore, the resist layer used for forming the inclined surfaces in the insulating layer can be formed to a substantially uniform thickness on the insulating layer and the upper pole layer.

As described above, in the present invention, the resist layer can be formed to a uniform thickness, and the pattern of the trench necessary for forming the inclined surfaces in the insulating layer can be precisely formed in the resist layer, thereby permitting the formation of the inclined surfaces in the predetermined shape in the portions of the insulating layer, which are exposed in the trench, with high reproducibility and controllability.

In the present invention, the inclined surfaces having the predetermined shape can easily be formed in the insulating layer with high reproducibility, and variations less occur in the shapes of the inclined surfaces of products. Therefore, in all products, the upper core layer formed on the inclined surfaces can be appropriately separated from the lower pole layer, thereby making adaptable to track narrowing and permitting manufacture of inductive heads causing less write fringing with high yield.

What is claimed is:

1. A thin film magnetic head comprising a lower core layer made of a magnetic material, an upper core layer made of a magnetic material, a gap layer to magnetically insulate the lower core layer from the upper core layer, and an insulating layer located between the lower core layer and the upper core layer, all of which are exposed in a surface facing a recording medium;

wherein a trench is formed in the insulating layer, the trench extending from the surface of the insulating layer to the lower core layer, and further extends from the surface facing the recording medium in a height direction;

the trench comprises a track-width region which defines a track width from a top of the lower core layer to a predetermined height, and an inclined region having inclined surfaces such that a width dimension of the trench gradually increases from an upper edge of the track-width region to the surface of the insulating layer;

the gap layer is located in the track-width region, and a portion of the upper core layer is formed to extend from the inclined surfaces formed in the trench in a direction away from the lower core layer; and the upper core layer is limited in a width direction to a region between extensions in a direction perpendicular to a planar direction of the lower core layer of upper ends of the inclined surfaces of the inclined region.

2. A thin film magnetic head according to claim 1, wherein the upper core layer is formed on the inclined surfaces to reach boundaries between the inclined surfaces and the surface of the insulating layer, and further extend from the boundaries in the direction away from the lower core layer.

3. A thin film magnetic head according to claim 1, wherein the upper core layer is formed to extend perpendicularly to a planar direction of the lower core layer.

4. A thin film magnetic head according to claim 1, wherein a thickness of the insulating layer gradually decreases from the inclined surfaces and extends in the direction away from the trench.

5. A thin film magnetic head according to claim 4, wherein the surface of the insulating layer from the inclined surfaces is concavely curved extending in the direction away from the trench.

6. A thin film magnetic head according to claim 1, wherein in the trench formed in the insulating layer, a lower pole layer is formed at the bottom to be magnetically connected to the lower core layer, the gap layer is formed on the lower pole layer, and an upper pole layer is formed on the gap layer to be magnetically connected to the upper core layer.

7. A thin film magnetic head according to claim 6, wherein both the lower pole layer and the upper pole layer are formed to reach into the track-width region of the trench.

* * * * *